(12) United States Patent
Crabb et al.

(10) Patent No.: US 11,192,195 B2
(45) Date of Patent: Dec. 7, 2021

(54) MITER SAW

(71) Applicant: MILWAUKEE ELECTRIC TOOL CORPORATION, Brookfield, WI (US)

(72) Inventors: Taylor Crabb, Milwaukee, WI (US); Josh Adams, Milwaukee, WI (US); Brian Wattenbach, Menomonee Falls, WI (US); Scott R. Fischer, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/159,217

(22) Filed: Oct. 12, 2018

(65) Prior Publication Data

US 2019/0091779 A1    Mar. 28, 2019

Related U.S. Application Data

(62) Division of application No. 15/053,733, filed on Feb. 25, 2016, now Pat. No. 10,882,123.

(Continued)

(51) Int. Cl.
  *B23D 45/04*  (2006.01)
  *B23D 47/02*  (2006.01)
  (Continued)

(52) U.S. Cl.
  CPC ........... *B23D 45/048* (2013.01); *B23D 47/02* (2013.01); *B23D 47/025* (2013.01);
  (Continued)

(58) Field of Classification Search
  CPC .. B23D 45/048; B23D 45/044; B23D 47/025; B23D 47/02; B23D 59/006;
  (Continued)

(56) References Cited

U.S. PATENT DOCUMENTS 1,480,263 A    1/1924  Hoffman
3,483,901 A    12/1969 Ray
(Continued)

FOREIGN PATENT DOCUMENTS

CN    1404952 A  *  3/2003
JP    2006142436    6/2006
(Continued)

OTHER PUBLICATIONS

JP-2007075981-A English Translation; Numata, Fumitoshi; Mar. 2007.*
(Continued)

*Primary Examiner* — Laura M Lee
(74) *Attorney, Agent, or Firm* — Michael Best & Friedrich LLP

(57) ABSTRACT

A miter saw includes a base assembly and a saw unit pivotably coupled to the base assembly. The saw unit includes a saw blade and a lower blade guard covering a lower portion of the saw blade. The miter saw also includes a linkage for raising the lower blade guard to expose the lower portion of the saw blade as the saw unit is lowered toward the base assembly. The linkage is operable to apply a force to the lower blade guard for holding the lower blade guard in a raised position, without any input from the operator of the miter saw and without changing the length of the linkage, to facilitate changing the saw blade.

8 Claims, 17 Drawing Sheets

Related U.S. Application Data

(60) Provisional application No. 62/265,916, filed on Dec. 10, 2015, provisional application No. 62/247,981, filed on Oct. 29, 2015, provisional application No. 62/238,851, filed on Oct. 8, 2015, provisional application No. 62/181,049, filed on Jun. 17, 2015, provisional application No. 62/120,521, filed on Feb. 25, 2015.

(51) Int. Cl.
  *B23D 59/00* (2006.01)
  *B27B 5/29* (2006.01)
(52) U.S. Cl.
  CPC ............ *B23D 59/003* (2013.01); *B27B 5/29* (2013.01); *Y10T 83/7697* (2015.04); *Y10T 83/7734* (2015.04); *Y10T 83/8773* (2015.04)
(58) Field of Classification Search
  CPC ............ B23D 59/003; Y10T 83/7697; Y10T 83/7788; Y10T 83/8773; Y10T 83/606; Y10T 83/7734; Y10T 83/7705; B27B 5/29
  See application file for complete search history.

(56) References Cited

U.S. PATENT DOCUMENTS

| | | | |
|---|---|---|---|
| 3,546,502 A | 12/1970 | Botefuhr et al. |
| 3,821,918 A | 7/1974 | Niehaus et al. |
| 3,931,751 A | 1/1976 | Simonson |
| 3,977,278 A | 8/1976 | Jackson |
| 3,998,121 A | 12/1976 | Bennett |
| 4,051,759 A | 10/1977 | Oliff |
| 4,075,916 A | 2/1978 | Fisher |
| 4,109,901 A | 8/1978 | Akin |
| 4,184,395 A | 1/1980 | Blachly et al. |
| 4,226,152 A | 10/1980 | Bies |
| 4,241,634 A | 12/1980 | Ambler |
| 4,245,533 A | 1/1981 | Batson |
| 4,265,154 A | 5/1981 | Batson |
| 4,270,427 A | 6/1981 | Colberg et al. |
| 4,299,152 A | 11/1981 | Ambler |
| 4,300,426 A | 11/1981 | Weaver |
| 4,315,494 A | 2/1982 | DiPlacido |
| 4,341,247 A | 7/1982 | Price |
| 4,365,531 A | 12/1982 | Potvin |
| 4,428,266 A | 1/1984 | Keddie |
| 4,448,102 A | 5/1984 | Thornton |
| 4,465,114 A | 8/1984 | Schumacher |
| 4,479,555 A | 10/1984 | Grossmann et al. |
| 4,519,280 A | 5/1985 | Cook |
| 4,531,441 A | 7/1985 | Bergler |
| 4,537,105 A | 8/1985 | Bergler |
| 4,561,336 A | 12/1985 | Davis |
| 4,581,966 A | 4/1986 | Kaiser et al. |
| 4,589,208 A | 5/1986 | Iwasaki et al. |
| 4,638,700 A | 1/1987 | Fushiya et al. |
| 4,646,801 A | 3/1987 | Hines |
| 4,658,686 A | 4/1987 | Woods |
| 4,707,204 A | 11/1987 | Heeg |
| 4,741,387 A | 5/1988 | Strong |
| 4,766,963 A | 8/1988 | Hartwig et al. |
| 4,774,866 A | 10/1988 | Dehari et al. |
| 4,783,945 A | 11/1988 | Heeg |
| 4,798,113 A | 1/1989 | Viazanko |
| 4,805,504 A | 2/1989 | Fushiya et al. |
| 4,833,782 A | 5/1989 | Smith |
| 4,869,142 A | 9/1989 | Sato et al. |
| 4,874,025 A | 10/1989 | Cleveland |
| 4,875,399 A | 10/1989 | Scott et al. |
| 4,882,962 A | 11/1989 | Terpstra et al. |
| 4,934,233 A * | 6/1990 | Brundage ............ B23D 45/044 83/397 |
| 4,937,705 A | 6/1990 | Fiber |
| 4,974,651 A | 12/1990 | Carmon et al. |
| 5,004,029 A | 4/1991 | Garner |
| 5,020,406 A | 6/1991 | Sasaki et al. |
| 5,038,650 A | 8/1991 | Hodge |
| 5,042,348 A | 8/1991 | Brundage et al. |
| 5,046,390 A | 9/1991 | Sasaki |
| 5,054,352 A | 10/1991 | Fushiya et al. |
| 5,060,548 A | 10/1991 | Sato et al. |
| 5,063,805 A | 11/1991 | Brundage |
| 5,105,862 A | 4/1992 | Skinner et al. |
| 5,117,560 A | 6/1992 | Nevins |
| 5,121,554 A | 6/1992 | Havins |
| 5,146,825 A | 9/1992 | Dehari et al. |
| 5,146,826 A | 9/1992 | Shiotani et al. |
| D331,416 S | 12/1992 | Fushiya et al. |
| 5,181,448 A | 1/1993 | Terpstra |
| D333,824 S | 3/1993 | Suzuki et al. |
| 5,193,598 A | 3/1993 | Estrem |
| 5,199,343 A | 4/1993 | O'Banion |
| 5,203,245 A | 4/1993 | Terpstra |
| 5,207,007 A | 5/1993 | Cucinotta et al. |
| 5,216,964 A | 6/1993 | Sato et al. |
| 5,220,857 A | 6/1993 | Freeburger |
| 5,235,889 A | 8/1993 | Brickner et al. |
| 5,239,905 A | 8/1993 | Dunn |
| 5,241,888 A | 9/1993 | Chen |
| 5,249,496 A | 10/1993 | Hirsch et al. |
| 5,269,356 A | 12/1993 | Bartz |
| 5,279,198 A | 1/1994 | Cross |
| 5,285,708 A | 2/1994 | Boston et al. |
| 5,289,047 A | 2/1994 | Broghammer |
| 5,297,463 A | 3/1994 | O'Banion et al. |
| 5,320,016 A | 6/1994 | Spath et al. |
| 5,320,150 A | 6/1994 | Everts et al. |
| 5,327,653 A | 7/1994 | Pistorius et al. |
| 5,347,902 A | 9/1994 | Brickner et al. |
| D351,393 S | 10/1994 | Sasaki et al. |
| 5,357,834 A | 10/1994 | Ito et al. |
| 5,361,853 A | 11/1994 | Takamura et al. |
| 5,370,025 A | 12/1994 | Itzov |
| 5,392,678 A | 2/1995 | Sasaki et al. |
| D357,140 S | 4/1995 | Hollinger et al. |
| 5,402,701 A | 4/1995 | Ingram |
| 5,421,228 A | 6/1995 | Fukinuki |
| 5,421,231 A | 6/1995 | Break et al. |
| 5,425,294 A | 6/1995 | Ushiwata et al. |
| 5,437,214 A | 8/1995 | Sasaki et al. |
| 5,452,515 A | 9/1995 | Schilling |
| 5,462,102 A | 10/1995 | Searfoss |
| 5,483,727 A | 1/1996 | Chang |
| 5,493,789 A | 2/1996 | Duginske |
| 5,497,816 A | 3/1996 | Darland |
| 5,513,548 A | 5/1996 | Garuglieri |
| 5,524,516 A | 6/1996 | Sasaki et al. |
| 5,526,856 A | 6/1996 | Pedri |
| D373,129 S | 8/1996 | Wixey et al. |
| 5,542,639 A | 8/1996 | Wixey et al. |
| 5,560,273 A | 10/1996 | Keddie |
| 5,566,603 A | 10/1996 | Moeres |
| 5,582,089 A | 12/1996 | Sasaki et al. |
| 5,592,981 A | 1/1997 | Derecktor |
| 5,623,860 A | 4/1997 | Schoene et al. |
| 5,660,094 A | 8/1997 | Sasaki et al. |
| D383,472 S | 9/1997 | Higuchi et al. |
| D383,765 S | 9/1997 | Kani et al. |
| RE35,627 E | 10/1997 | Estrem |
| D388,442 S | 12/1997 | Shibata et al. |
| D388,443 S | 12/1997 | Kondo |
| 5,713,258 A | 2/1998 | Keddie |
| 5,720,096 A | 2/1998 | Dorsey |
| 5,724,875 A | 3/1998 | Meredith et al. |
| 5,730,434 A | 3/1998 | Schoene et al. |
| 5,735,054 A | 4/1998 | Cole |
| 5,735,324 A | 4/1998 | Ponce |
| 5,737,986 A | 4/1998 | Garuglieri |
| 5,737,990 A | 4/1998 | Freeland et al. |
| 5,752,422 A | 5/1998 | Inoue et al. |
| 5,755,148 A | 5/1998 | Stumpf et al. |

(56) References Cited

U.S. PATENT DOCUMENTS

| | | |
|---|---|---|
| 5,768,967 A | 6/1998 | Sasaki et al. |
| 5,771,767 A | 6/1998 | Itami |
| 5,775,192 A | 7/1998 | Fuecker et al. |
| 5,778,747 A | 7/1998 | Chen |
| 5,782,153 A | 7/1998 | Sasaki et al. |
| 5,787,779 A | 8/1998 | Garuglieri |
| 5,791,224 A | 8/1998 | Suzuki et al. |
| 5,802,943 A | 9/1998 | Brunson et al. |
| 5,816,129 A | 10/1998 | Singer |
| 5,819,619 A | 10/1998 | Miller et al. |
| 5,819,624 A | 10/1998 | Brault et al. |
| 5,823,085 A | 10/1998 | Kondo et al. |
| 5,839,339 A | 11/1998 | Sasaki et al. |
| 5,845,410 A | 12/1998 | Boker |
| 5,850,698 A | 12/1998 | Hurn et al. |
| D404,043 S | 1/1999 | Brunson |
| 5,856,715 A | 1/1999 | Peot et al. |
| 5,862,732 A | 1/1999 | Itzov |
| 5,862,734 A | 1/1999 | Brunson et al. |
| 5,865,079 A | 2/1999 | Itzov |
| 5,870,938 A | 2/1999 | Brunson et al. |
| 5,870,939 A | 2/1999 | Matsubara |
| 5,875,828 A | 3/1999 | Quiram et al. |
| 5,893,311 A | 4/1999 | Huang |
| 5,894,776 A | 4/1999 | Bartz |
| 5,907,987 A | 6/1999 | Stumpf et al. |
| D412,333 S | 7/1999 | Stumpf et al. |
| 5,921,301 A | 7/1999 | Quiram et al. |
| 5,930,903 A | 8/1999 | Hum et al. |
| 5,931,072 A | 8/1999 | Shibata |
| 5,931,073 A | 8/1999 | Hoyer-Ellefsen |
| 5,937,720 A | 8/1999 | Itzov |
| 5,943,931 A | 8/1999 | Stumpf et al. |
| 5,950,514 A | 9/1999 | Benedict et al. |
| 5,957,021 A | 9/1999 | Meredith et al. |
| 5,957,022 A | 9/1999 | Stumpf et al. |
| 5,960,691 A | 10/1999 | Garuglieri |
| 5,969,312 A | 10/1999 | Svetlik et al. |
| D415,942 S | 11/1999 | Shibata et al. |
| 5,979,283 A | 11/1999 | Osborne |
| 5,988,031 A | 11/1999 | Wixey |
| 5,988,243 A | 11/1999 | Ayala et al. |
| D418,149 S | 12/1999 | Brunson et al. |
| 5,996,460 A | 12/1999 | Waite |
| 6,000,140 A | 12/1999 | Nickels, Jr. et al. |
| 6,016,732 A | 1/2000 | Brault et al. |
| D420,369 S | 2/2000 | Shibata et al. |
| D420,370 S | 2/2000 | Shibata et al. |
| D421,267 S | 2/2000 | Price et al. |
| 6,026,576 A | 2/2000 | Hurn et al. |
| 6,029,721 A | 2/2000 | O'Banion |
| 6,032,562 A | 3/2000 | Brunson et al. |
| 6,032,563 A | 3/2000 | Stumpf et al. |
| 6,035,754 A | 3/2000 | Stumpf et al. |
| D423,020 S | 4/2000 | Brunson |
| D423,526 S | 4/2000 | Brazell et al. |
| D424,072 S | 5/2000 | Shibata et al. |
| D425,083 S | 5/2000 | Brickner, Jr. et al. |
| D425,917 S | 5/2000 | Brunson |
| 6,067,885 A | 5/2000 | Brunson et al. |
| 6,073,529 A | 6/2000 | Shibata et al. |
| D428,426 S | 7/2000 | Brazell |
| 6,101,914 A | 8/2000 | Brunson et al. |
| 6,145,205 A | 11/2000 | Nickels, Jr. et al. |
| 6,155,318 A | 12/2000 | Underwood |
| 6,170,373 B1 | 1/2001 | Sasaki et al. |
| 6,182,548 B1 | 2/2001 | Meredith et al. |
| 6,195,905 B1 | 3/2001 | Cole |
| 6,199,608 B1 | 3/2001 | Ayala et al. |
| 6,272,961 B1 | 8/2001 | Lee |
| 6,279,442 B1 | 8/2001 | Chang |
| 6,289,778 B1 | 9/2001 | Wixey |
| 6,289,779 B1 | 9/2001 | Wang |
| 6,320,286 B1 | 11/2001 | Ramarathnam |
| D453,569 S | 2/2002 | Himbert |
| 6,427,570 B1 | 5/2002 | Miller et al. |
| D459,373 S | 6/2002 | Hollinger et al. |
| 6,397,717 B1 | 6/2002 | Waite |
| 6,401,584 B1 | 6/2002 | Rowe |
| 6,415,831 B2 | 7/2002 | Ayala et al. |
| 6,418,830 B1 | 7/2002 | Stumpf et al. |
| 6,425,309 B1 | 7/2002 | Stumpf et al. |
| 6,431,040 B1 | 8/2002 | Miller et al. |
| 6,431,042 B1 | 8/2002 | Brault et al. |
| 6,470,778 B1 | 10/2002 | Kaye, Jr. et al. |
| 6,474,206 B1 | 11/2002 | Brunson |
| 6,474,207 B1 | 11/2002 | Itzov |
| 6,477,929 B1 | 11/2002 | Gibbs, Sr. |
| D467,256 S | 12/2002 | Chunn et al. |
| 6,510,722 B1 | 1/2003 | Brickner, Jr. et al. |
| 6,510,772 B2 | 1/2003 | Ching et al. |
| 6,513,412 B2 | 2/2003 | Young |
| 6,520,059 B1 | 2/2003 | Stumpf et al. |
| 6,523,447 B2 | 2/2003 | Judge |
| 6,530,303 B1 | 3/2003 | Parks et al. |
| 6,532,679 B2 | 3/2003 | Cole |
| 6,532,853 B1 | 3/2003 | Kakimoto et al. |
| 6,543,323 B2 | 4/2003 | Hayashizaki et al. |
| RE38,122 E | 5/2003 | Kondo et al. |
| 6,561,068 B2 | 5/2003 | Meredith et al. |
| 6,575,067 B2 | 6/2003 | Parks et al. |
| 6,581,502 B1 | 6/2003 | Ryan |
| 6,595,095 B2 | 7/2003 | Chen |
| 6,595,251 B2 | 7/2003 | Ayala et al. |
| D478,103 S | 8/2003 | Kani et al. |
| 6,606,931 B1 | 8/2003 | Brunson et al. |
| 6,615,701 B2 | 9/2003 | Hollinger et al. |
| 6,616,295 B2 | 9/2003 | Sako et al. |
| 6,631,661 B2 | 10/2003 | Brunson et al. |
| 6,658,977 B2 | 12/2003 | Chang |
| 6,662,697 B1 | 12/2003 | Chen |
| 6,692,864 B1 | 2/2004 | Dansui et al. |
| 6,731,503 B2 | 5/2004 | Privett et al. |
| 6,732,627 B2 | 5/2004 | Wattenbach et al. |
| 6,742,425 B2 | 6/2004 | Oktavec et al. |
| 6,742,430 B2 | 6/2004 | Chen |
| 6,745,804 B2 | 6/2004 | Welsh et al. |
| 6,755,107 B2 | 6/2004 | Peot et al. |
| 6,758,122 B2 | 7/2004 | Kao |
| 6,758,123 B2 | 7/2004 | Svetlik et al. |
| 6,763,751 B2 | 7/2004 | Judge |
| 6,779,428 B2 | 8/2004 | Kao |
| 6,810,780 B2 | 11/2004 | Ceroll et al. |
| 6,823,765 B2 | 11/2004 | Stumpf et al. |
| 6,854,372 B2 | 2/2005 | Anthony |
| 6,865,976 B2 | 3/2005 | Parks et al. |
| 6,886,440 B2 | 5/2005 | Parks et al. |
| 6,892,619 B1 | 5/2005 | Chang |
| 6,899,005 B1 | 5/2005 | O'Banion et al. |
| 6,920,047 B2 | 7/2005 | Privett et al. |
| 6,971,297 B1 | 12/2005 | Meredith et al. |
| 6,971,298 B2 | 12/2005 | Ushiwata et al. |
| 6,988,435 B2 | 1/2006 | Kao |
| 6,990,883 B2 | 1/2006 | Stumpf et al. |
| 6,994,007 B2 | 2/2006 | Kenyon et al. |
| 6,997,091 B1 | 2/2006 | Shibata |
| 7,013,780 B2 | 3/2006 | Brunson |
| 7,039,548 B2 | 5/2006 | Takano et al. |
| 7,048,021 B2 | 5/2006 | Ayala et al. |
| 7,069,831 B2 | 7/2006 | Chang |
| 7,096,587 B2 | 8/2006 | Onose et al. |
| 7,109,613 B2 | 9/2006 | Lui |
| 7,114,425 B2 | 10/2006 | Romo et al. |
| 7,127,977 B2 | 10/2006 | Carroll et al. |
| 7,131,206 B2 | 11/2006 | Wu |
| 7,178,438 B2 | 2/2007 | Xin et al. |
| 7,185,998 B2 | 3/2007 | Oomori et al. |
| 7,201,090 B2 | 4/2007 | Svetlik et al. |
| 7,204,178 B2 | 4/2007 | Bergmann |
| 7,210,385 B2 | 5/2007 | Stumpf et al. |
| 7,210,415 B2 | 5/2007 | Brunson |
| 7,222,560 B2 | 5/2007 | Parks et al. |
| 7,226,179 B2 | 6/2007 | Garcia et al. |
| 7,243,587 B2 | 7/2007 | Carroll et al. |

(56) References Cited

U.S. PATENT DOCUMENTS

| | | |
|---|---|---|
| 7,252,027 B2 | 8/2007 | Meredith et al. |
| 7,267,039 B2 | 9/2007 | Liao et al. |
| 7,287,453 B2 | 10/2007 | Kuo |
| 7,311,028 B2 | 12/2007 | Garcia et al. |
| 7,337,702 B2 | 3/2008 | Parks et al. |
| 7,346,992 B2 | 3/2008 | Hunger |
| 7,367,253 B2 | 5/2008 | Romo et al. |
| 7,387,056 B2 | 6/2008 | Higuchi |
| 7,406,902 B2 | 8/2008 | Shibata et al. |
| 7,530,297 B2 | 5/2009 | Carroll et al. |
| 7,530,377 B2 | 5/2009 | Ayala et al. |
| 7,559,268 B2 | 7/2009 | Sasaki et al. |
| 7,574,950 B2 | 8/2009 | Hetcher et al. |
| 7,617,755 B2 | 11/2009 | Bean et al. |
| 7,703,366 B2 | 4/2010 | Garcia et al. |
| 7,726,225 B2 | 6/2010 | Imamura et al. |
| 7,789,003 B2 | 9/2010 | Chen |
| 7,797,844 B2 | 9/2010 | Den et al. |
| 7,798,041 B2 | 9/2010 | Hetcher et al. |
| 7,802,505 B2 | 9/2010 | Hetcher et al. |
| RE41,857 E | 10/2010 | Chang |
| 7,814,947 B2 | 10/2010 | Ayala et al. |
| 7,819,044 B2 | 10/2010 | Meredith et al. |
| 7,882,771 B2 | 2/2011 | Sasaki et al. |
| 7,934,847 B2 | 5/2011 | Oomori et al. |
| 7,946,906 B2 | 5/2011 | Gifford et al. |
| 7,990,005 B2 | 8/2011 | Walter et al. |
| 7,992,478 B2 | 8/2011 | Meredith et al. |
| 7,997,177 B2 | 8/2011 | Ushiwata et al. |
| 8,025,001 B2 | 9/2011 | Chen et al. |
| 8,061,251 B2 | 11/2011 | Hetcher et al. |
| 8,069,761 B2 | 12/2011 | Brunson et al. |
| 8,104,388 B2 | 1/2012 | Liu |
| 8,161,858 B2 | 4/2012 | Aoyama |
| 8,176,823 B2 | 5/2012 | Lawlor |
| 8,176,824 B2 | 5/2012 | Lawlor |
| 8,254,125 B2 | 8/2012 | Chen |
| 8,266,994 B2 | 9/2012 | Cox |
| 8,272,304 B2 | 9/2012 | Lawlor et al. |
| 8,272,454 B2 | 9/2012 | Kani et al. |
| 8,291,804 B2 | 10/2012 | Mammel |
| 8,307,562 B2 | 11/2012 | Bascom et al. |
| 8,375,836 B2 | 2/2013 | Kani et al. |
| 8,410,645 B2 | 4/2013 | Lau |
| 8,418,560 B2 | 4/2013 | Agan et al. |
| 8,418,590 B2 | 4/2013 | Agan et al. |
| 8,424,213 B2 | 4/2013 | Fukinuki |
| 8,511,211 B2 | 8/2013 | Cox |
| 8,517,558 B2 | 8/2013 | Oomori et al. |
| 8,573,104 B2 | 11/2013 | Thomas |
| 8,578,621 B2 | 11/2013 | Montplaisir et al. |
| 8,607,680 B1 | 12/2013 | Carr |
| 8,631,733 B2 | 1/2014 | Imamura et al. |
| 8,657,031 B2 | 2/2014 | Kononenko et al. |
| 8,661,956 B2 | 3/2014 | Thomas |
| 8,695,224 B2 | 4/2014 | Gehret |
| 8,695,468 B2 | 4/2014 | Thomas |
| 8,733,220 B2 | 5/2014 | Xu |
| 8,776,656 B2 | 7/2014 | Weusthof |
| 8,810,085 B2 | 8/2014 | Matsunaga et al. |
| 8,858,301 B2 | 10/2014 | Reid |
| 8,919,235 B2 | 12/2014 | Sudou et al. |
| 8,960,063 B2 | 2/2015 | Kaye, Jr. et al. |
| 9,162,298 B2 | 10/2015 | Chiang et al. |
| 9,393,659 B2 * | 7/2016 | Wu .................. B27G 19/02 |
| 10,265,787 B2 | 4/2019 | Lawlor et al. |
| 2001/0000856 A1 | 5/2001 | O'Banion |
| 2001/0008098 A1 | 7/2001 | Dibber, Jr. et al. |
| 2001/0047706 A1 | 12/2001 | Parks et al. |
| 2002/0011702 A1 | 1/2002 | Otsuka et al. |
| 2002/0017179 A1 | 2/2002 | Gass et al. |
| 2002/0029678 A1 | 3/2002 | Erisoty |
| 2002/0050201 A1 | 5/2002 | Lane et al. |
| 2002/0056348 A1 | 5/2002 | Gass et al. |
| 2002/0056349 A1 | 5/2002 | Gass et al. |
| 2002/0059853 A1 | 5/2002 | Gass et al. |
| 2002/0059854 A1 | 5/2002 | Gass et al. |
| 2002/0066346 A1 | 6/2002 | Gass et al. |
| 2002/0100350 A1 | 8/2002 | Brazell |
| 2002/0100352 A1 | 8/2002 | Dils et al. |
| 2002/0104417 A1 | 8/2002 | Chen |
| 2002/0129688 A1 | 9/2002 | Watson |
| 2002/0144582 A1 | 10/2002 | He |
| 2002/0152862 A1 | 10/2002 | Waite |
| 2002/0157731 A1 | 10/2002 | Harper |
| 2002/0001703 A1 | 11/2002 | Gass et al. |
| 2002/0178884 A1 | 12/2002 | Chuang et al. |
| 2003/0002008 A1 | 1/2003 | Inoue et al. |
| 2003/0005801 A1 | 1/2003 | Calcote |
| 2003/0007326 A1 | 1/2003 | Terhaar et al. |
| 2003/0015078 A1 | 1/2003 | Taylor |
| 2003/0033920 A1 | 2/2003 | Parks et al. |
| 2003/0041715 A1 | 3/2003 | Brazell et al. |
| 2003/0047050 A1 | 3/2003 | Onose et al. |
| 2003/0056630 A1 | 3/2003 | Phillips |
| 2003/0056631 A1 | 3/2003 | Duginske |
| 2003/0056632 A1 | 3/2003 | Ng et al. |
| 2003/0089212 A1 | 5/2003 | Parks et al. |
| 2003/0094082 A1 | 5/2003 | Meged |
| 2003/0110914 A1 | 6/2003 | Brazell et al. |
| 2003/0117028 A1 | 6/2003 | Agnes et al. |
| 2003/0140758 A1 | 7/2003 | Weusthof et al. |
| 2003/0140759 A1 | 7/2003 | Meredith et al. |
| 2003/0145705 A1 | 8/2003 | Miller |
| 2003/0150309 A1 | 8/2003 | Goodwin et al. |
| 2003/0172789 A1 | 9/2003 | Chen |
| 2003/0200852 A1 | 10/2003 | Romo |
| 2003/0209107 A1 | 11/2003 | Dibbon, Jr. et al. |
| 2004/0000163 A1 | 1/2004 | Shull et al. |
| 2004/0003696 A1 | 1/2004 | Radda |
| 2004/0020342 A1 | 2/2004 | Wattenbach |
| 2004/0049927 A1 | 3/2004 | Wu |
| 2004/0079214 A1 | 4/2004 | Meredith et al. |
| 2004/0089125 A1 | 5/2004 | Schoene et al. |
| 2004/0112190 A1 | 6/2004 | Hollis et al. |
| 2005/0217448 A1 | 10/2005 | Walker |
| 2005/0247177 A1 | 11/2005 | Hetcher et al. |
| 2005/0247178 A1 | 11/2005 | Hetcher et al. |
| 2005/0284276 A1 | 12/2005 | Talesky et al. |
| 2005/0286261 A1 | 12/2005 | Lin |
| 2006/0001103 A1 | 1/2006 | Gehret et al. |
| 2006/0005681 A1 | 1/2006 | Lambert et al. |
| 2006/0042444 A1 | 3/2006 | Ushiwata et al. |
| 2006/0101967 A1 | 5/2006 | Garcia et al. |
| 2006/0156883 A1 | 7/2006 | Kenyon et al. |
| 2006/0162523 A1 | 7/2006 | Hetcher et al. |
| 2006/0230894 A1 | 10/2006 | Meredith et al. |
| 2006/0243113 A1 | 11/2006 | Kaye, Jr. et al. |
| 2006/0249000 A1 | 11/2006 | Meredith et al. |
| 2006/0266184 A1 | 11/2006 | Hetcher et al. |
| 2007/0163410 A1 | 7/2007 | Stumpf et al. |
| 2007/0234865 A1 | 10/2007 | Spinelli et al. |
| 2008/0028908 A1 | 2/2008 | Meredith et al. |
| 2008/0047406 A1 | 2/2008 | Hollis et al. |
| 2008/0053805 A1 | 3/2008 | Wanek |
| 2008/0150375 A1 | 6/2008 | Shima |
| 2008/0179078 A1 | 7/2008 | Opsitos |
| 2008/0210073 A1 | 9/2008 | Zhang |
| 2009/0077817 A1 | 3/2009 | Gibbons et al. |
| 2009/0120258 A1 | 5/2009 | Meredith et al. |
| 2009/0151529 A1 | 6/2009 | Miura |
| 2009/0229957 A1 | 9/2009 | Nishimya et al. |
| 2009/0301277 A1 | 12/2009 | Ipatenco et al. |
| 2010/0018373 A1 | 1/2010 | Meredith et al. |
| 2010/0083513 A1 | 4/2010 | Pellenc |
| 2010/0091470 A1 | 4/2010 | Ostling |
| 2010/0224667 A1 | 9/2010 | Schiestl et al. |
| 2010/0242699 A1 | 9/2010 | Sasaki et al. |
| 2010/0253162 A1 | 10/2010 | Sakamaki et al. |
| 2010/0263511 A1 | 10/2010 | Firth |
| 2010/0275755 A1* | 11/2010 | Cox .................. B23Q 11/06 |
| | | 83/471.3 |
| 2011/0174129 A1 | 7/2011 | Weusthof |
| 2011/0185581 A1 | 8/2011 | Xing et al. |

(56) References Cited

U.S. PATENT DOCUMENTS

| | | |
|---|---|---|
| 2011/0265625 A1 | 11/2011 | Lawlor et al. |
| 2011/0308368 A1 | 12/2011 | Brown et al. |
| 2012/0031248 A1 | 2/2012 | Park et al. |
| 2012/0198708 A1 | 8/2012 | Naito et al. |
| 2013/0048329 A1 | 2/2013 | Qian |
| 2013/0119792 A1 | 5/2013 | Nishimya et al. |
| 2013/0142634 A1 | 6/2013 | Cuzdey |
| 2013/0239767 A1 | 9/2013 | Agan et al. |
| 2013/0247737 A1 | 9/2013 | Chen |
| 2013/0313925 A1 | 11/2013 | Mergener et al. |
| 2014/0013912 A1 | 1/2014 | Chen et al. |
| 2014/0224089 A1 | 8/2014 | Thomas |
| 2014/0242517 A1 | 9/2014 | Glasgow et al. |
| 2014/0245621 A1 | 9/2014 | Gehret |
| 2014/0245622 A1 | 9/2014 | Gehret |
| 2014/0250704 A1 | 9/2014 | Chiang et al. |
| 2014/0272517 A1 | 9/2014 | Glasgow et al. |
| 2014/0361645 A1 | 12/2014 | Beyerl |
| 2014/0366697 A1 | 12/2014 | Lin |
| 2015/0000203 A1 | 1/2015 | Abe et al. |
| 2016/0229045 A1 | 8/2016 | Hashimoto et al. |
| 2018/0311861 A1 | 11/2018 | Yu et al. |

FOREIGN PATENT DOCUMENTS

| | | | |
|---|---|---|---|
| JP | 2007075981 A | * | 3/2007 |
| JP | 2015116650 | | 6/2015 |
| WO | WO 2003017742 | | 2/2003 |
| WO | 2014150859 A1 | | 9/2014 |
| WO | WO 2015093057 | | 6/2015 |

OTHER PUBLICATIONS

CN-1404952-A English Translation; Xie Heping Mar. 2003.*
Bosch "3924 Cordless Miter Saw Operator's Manual" downloaded from the web site <https://www.boschtools.com/US/en/ocsmedia/r00155v1.pdf> on May 4, 2015.
Makita "18V LXT Lithium-Ion Cordless 7-½ Dual Slide Compound Miter Saw Instruction Manual" downloaded from the web site <http://www.makitatools.com/enus/Modules/Tools/ToolDetails.aspx?Name=LXSL01Z> on Mar. 24, 2015.
Ryobi "MS180 Cordless Miter Saw Operator's Manual" downloaded from the web site <https://manuals.ttigroupna.com/system/files/5885/original/ms180_059_eng.pdf?2011> on May 4, 2015.
Ryobi "MS181 Cordless Miter Saw Operator's Manual" downloaded from the web site <https://manuals.ttigroupna.com/system/files/5888/original/MS181_075_eng.pdf?2011> on May 4, 2015.
Ryobi "P550 Cordless Miter Saw Operator's Manual" downloaded from the web site <https://www.ryobitools.com/support/manuals/details/P550> on May 4, 2015.
Ryobi "P551 Cordless Miter Saw Operator's Manual" downloaded from the web site <https://manuals.ttigroupna.com/system/files/5896/original/P551_224_eng_04.pdf?2013> on Dec. 11, 2015.
International Search Report and Written Opinion for Application No. PCT/US2016/019592 dated Jun. 24, 2016, 19 pages.
European Patent Office Search Report for Application No. 16756372.5 dated Oct. 16, 2018, 13 pages.

* cited by examiner

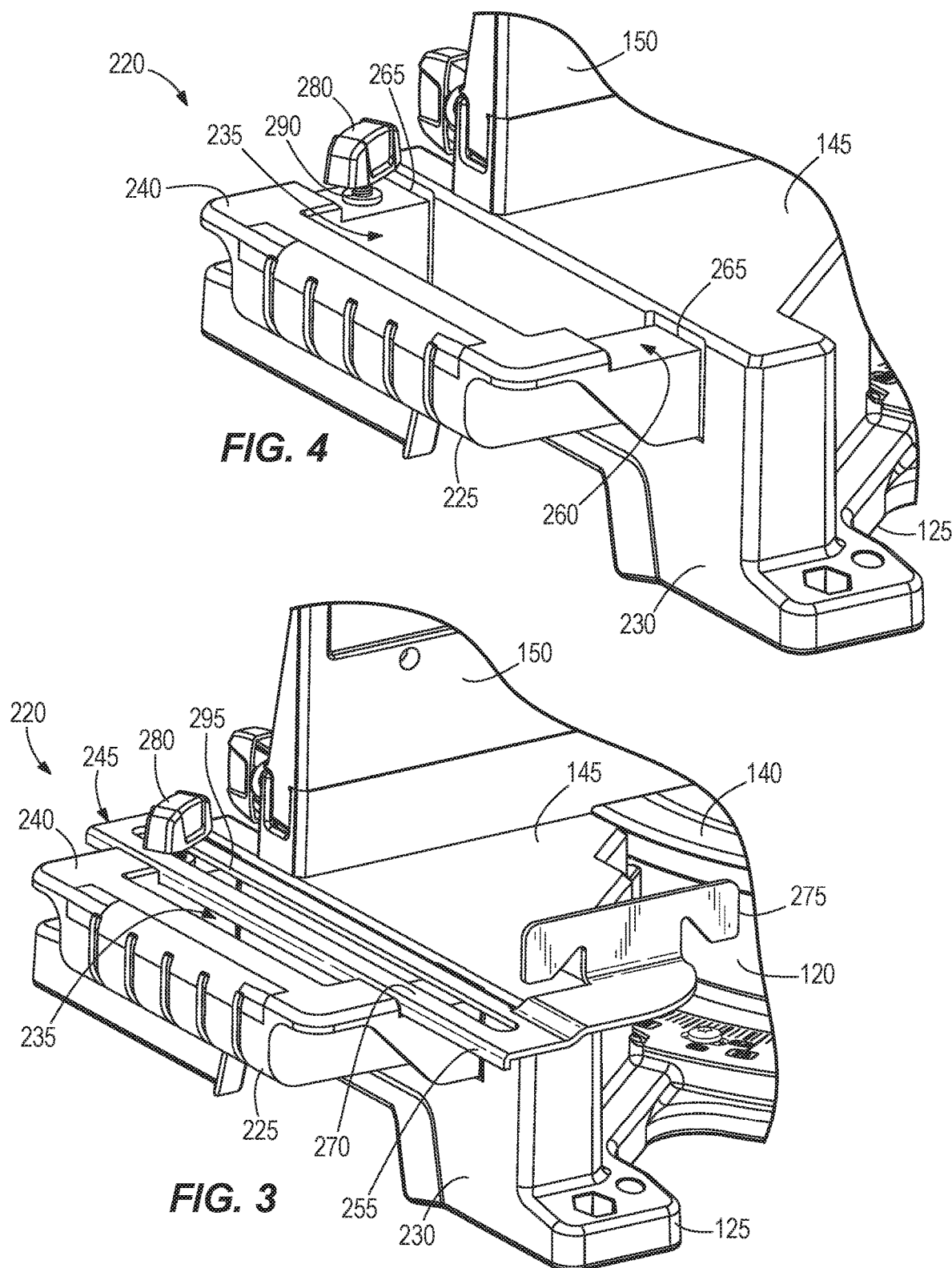

MITER SAW

CROSS-REFERENCE TO RELATED APPLICATIONS

This application is a divisional of U.S. patent application Ser. No. 15/053,733 filed on Feb. 25, 2016, now U.S. Pat. No. 10,882,123, which claims priority to U.S. Provisional Patent Application No. 62/120,521 filed on Feb. 25, 2015, U.S. Provisional Patent Application No. 62/181,049 filed on Jun. 17, 2015, U.S. Provisional Patent Application No. 62/238,851 filed on Oct. 8, 2015, U.S. Provisional Patent Application No. 62/247,981 filed on Oct. 29, 2015, and U.S. Provisional Patent Application No. 62/265,916 filed on Dec. 10, 2015, the entire contents of which are incorporated herein by reference.

FIELD OF THE INVENTION

The present invention relates to power tools, and more particularly to miter saws.

SUMMARY OF THE INVENTION

The present invention provides, in another aspect, a miter saw including a base assembly and a saw unit pivotably coupled to the base assembly. The saw unit includes a saw blade and a lower blade guard covering a lower portion of the saw blade. The miter saw also includes a linkage for raising the lower blade guard to expose the lower portion of the saw blade as the saw unit is lowered toward the base assembly. The linkage is operable to apply a force to the lower blade guard for holding the lower blade guard in a raised position, without any input from the operator of the miter saw and without changing the length of the linkage, to facilitate changing the saw blade.

The present invention provides, in another aspect, a miter saw including a base assembly and a saw unit pivotably coupled to the base assembly. The saw unit includes a saw blade and a lower blade guard covering a lower portion of the saw blade. The miter saw also includes a linkage having a rear end pivotably coupled to the base assembly about a first pivot axis and an opposite front end. The length of the linkage between the front and rear ends is fixed. The linkage includes a slot, having a front end and a rear end, proximate the front end of the linkage in which a protrusion of the lower blade guard is received. The linkage is operable to raise the lower blade guard to expose the lower portion of the saw blade as the saw unit is lowered toward the base assembly. The rear end of the slot is engageable with the protrusion of the lower blade guard for holding the lower blade guard in a raised position to facilitate changing the saw blade.

Other features and aspects of the invention will become apparent by consideration of the following detailed description and accompanying drawings.

BRIEF DESCRIPTION OF THE DRAWINGS

FIG. 3 is an enlarged view of a handle assembly of the miter saw of FIG. 1 including an adjustable work stop.

FIG. 4 is an enlarged view of the handle assembly of FIG. 3 with the adjustable work stop removed.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
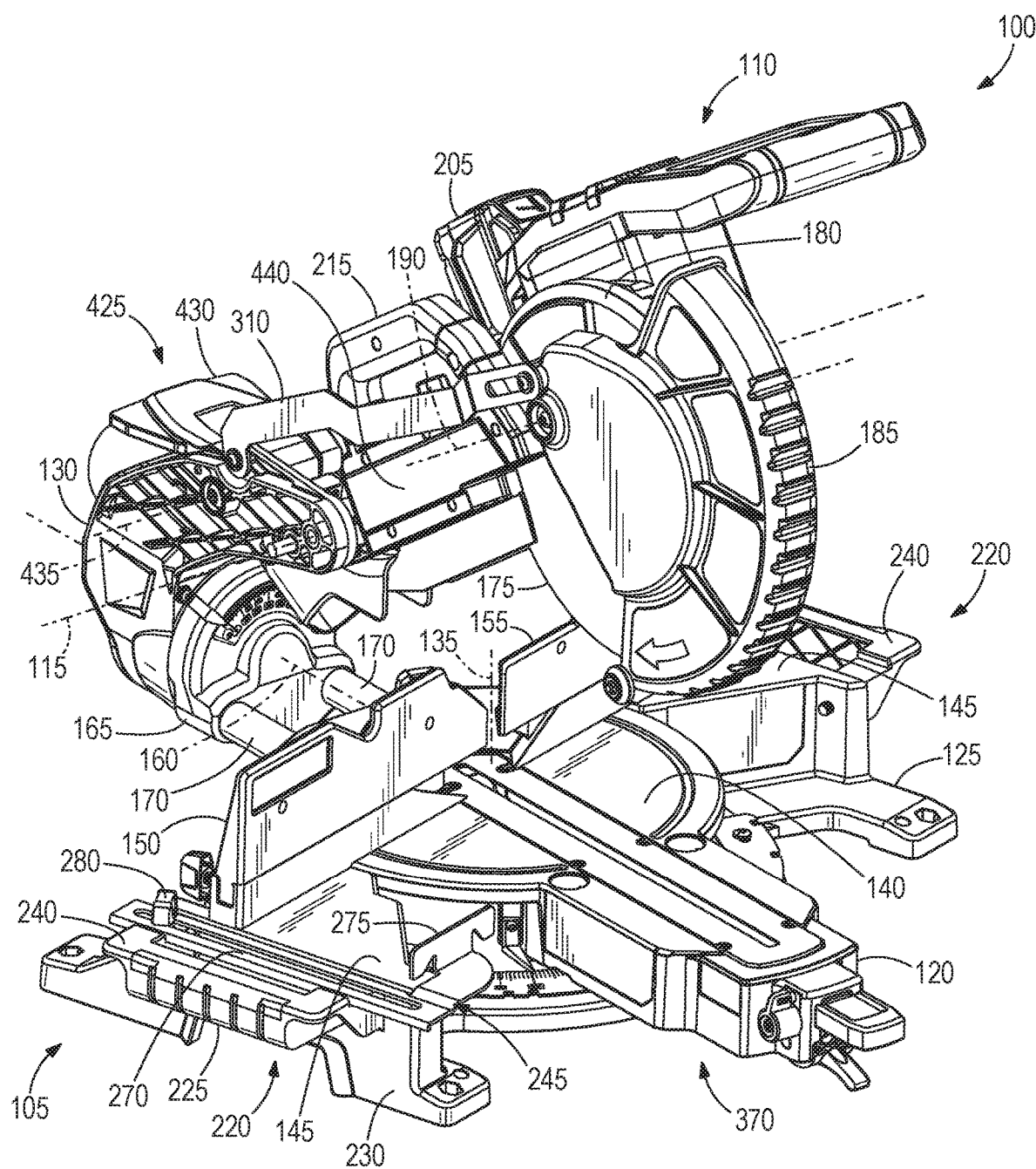
FIG. 1 is a front perspective view of a miter saw according to an embodiment of the invention.
Figure 2:
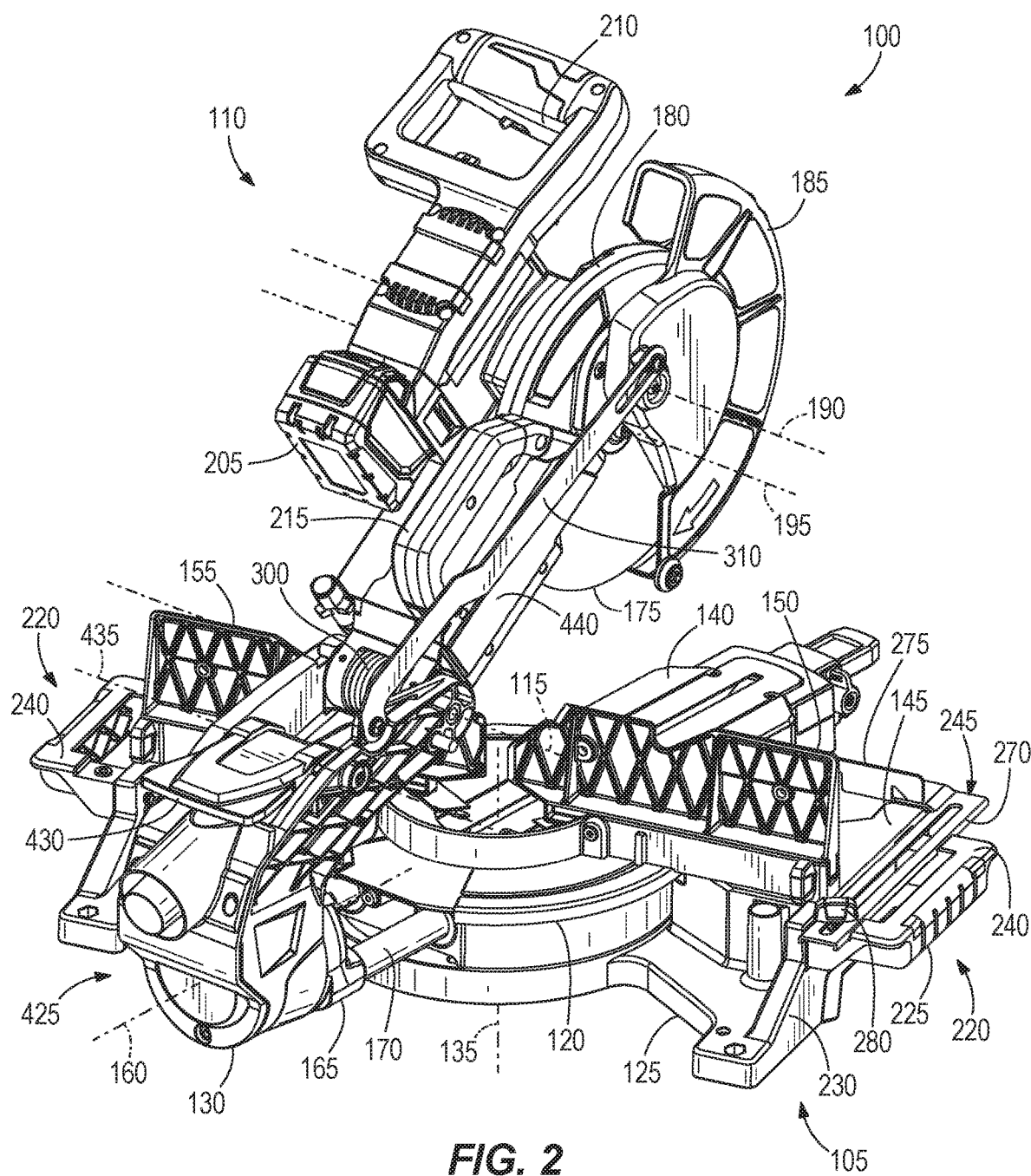
FIG. 2 is a rear perspective view of the miter saw of FIG. 1.

With reference to FIGS. 1 and 2, a power tool (i.e., miter saw 100) includes a base assembly 105 and a saw unit 110 pivotably coupled to the base assembly 105 about a first or "chopping" axis 115. The illustrated base assembly 105 includes a turntable 120, a base 125, and a bevel arm 130, with the turntable 120 pivotably coupled to the base 125 about a second or miter axis 135 for performing a first angled cut (e.g., a miter cut) on a work piece. The turntable 120 defines a first work piece support surface 140 and the base 125 defines second work piece support surfaces 145 that are coplanar with the first work piece support surface 140. The base assembly 105 also includes spaced fence assemblies 150, 155 positioned on opposite sides of the miter axis 135 that extend perpendicular to the work piece support surfaces 140, 145.

The saw unit 110 and the bevel arm 130 are configured to pivot with the turntable 120 about the miter axis 135. The saw unit 110 and bevel arm 130 are also pivotably coupled to the base 125 about a third or "bevel" axis 160 for performing a second angled cut (e.g., a bevel cut) on the work piece. In particular, the saw unit 110 and the bevel arm 130 pivot relative to a bevel arm mount 165 about the bevel axis 160 with the bevel arm mount 165 being affixed to guide rails 170 which, in turn, are slidably coupled to the turntable 120 in a direction parallel with the bevel axis 160 (i.e., in a fore-aft direction).

The illustrated saw unit 110 includes a saw blade 175, an upper blade guard 180 that covers an upper portion of the saw blade 175, and a lower blade guard 185 that selectively covers a lower portion of the saw blade 175. The lower blade guard 185 pivots relative to the upper blade guard 180 about a fourth axis 190, which is parallel with and spaced from a rotational axis 195 of the saw blade 175 (FIG. 2). The saw unit 110 also includes a motor 200 (FIG. 11), a battery 205 for powering the motor 200 (FIGS. 1 and 2), and an actuator (e.g., a trigger 210; FIG. 2) for selectively activating the motor 200. In the illustrated embodiment of the miter saw 100, the battery 205 is configured as an 18 volt lithium-ion power tool battery pack 205 that is also operable to power other power tools (e.g., drills, circular saws, and the like). In other embodiments, the battery pack 205 may include a different nominal voltage (e.g., 12 volts, 28 volts, etc.). In yet other embodiments, the miter saw 100 may include a power cord for connection to an external power source (e.g., AC power through a wall outlet). The illustrated motor 200 is a brushless direct current (i.e., DC) motor; but, in other embodiments of the miter saw 100, the motor 200 may be a brushed DC motor or an alternating current (i.e., AC) motor.

With reference to FIG. 1, the illustrated saw unit 110 includes a saw unit handle 215 that is graspable to facilitate transport and movement of the miter saw 100. The miter saw 100 further includes handle assemblies 220 positioned on each side of the base 125 (FIG. 3). Each of the handle assemblies 220 includes a handle 225 which, in combination with the saw unit handle 215, facilitates transport and movement of the miter saw 100. The handles 225 are attached, respectively, to opposite side walls 230 of the base 125 by threaded fasteners (e.g., screws, not shown). Alternatively, quick-release fasteners may be used to attach the handles 225 to the base 125, thereby permitting rapid installation and removal of the handle assemblies 220 from the base assembly 105. In the illustrated embodiment, the handles 225 are "U" shaped to define (in conjunction with the side walls 230 of the base 125) a cavity 235 through which individuals may place their fingers to grasp each of the handles 225.

Each of the handles 225 includes a third work piece support surface 240 that is coplanar with the first and second work piece support surfaces 140, 145 of the turntable 120 and the base 125, respectively. Accordingly, the handles 225 may also function as extensions to the primary work piece support surface of the miter saw 100, which is collectively defined by the first and second work piece support surfaces 140, 145.

With continued reference to FIG. 3, each of the handle assemblies 220 also includes a work stop 245 that is adjustable relative to the base 125 and the first and second fence assemblies 150, 155 for securing a work piece 250 (e.g., crown molding) to the base 125 and/or the first and second fence assemblies 150, 155 during a cutting operation. In the illustrated embodiment of the miter saw 100, the work stop 245 includes a rail 255 slidably received within a guide track 260 (FIG. 4) defined by aligned slots 265 positioned between the first and second work piece support surfaces 140, 145 of the base 125 and the handle 225, respectively. The guide track 260 extends in the fore-aft direction of the miter saw 100; therefore, movement of the rail 255 within the guide track 260 is limited to the fore-aft direction relative to the base 125 and the first and second fence assemblies 150, 155. Also, in the illustrated embodiment of the miter saw 100, the slots 265 are defined by a combination of the handle 225 and the side wall 230 of the base 125. Alternatively, the slots 265 may be defined in the middle of the third work piece support surface 240 of each of the handles 225.

The depth of the slot 330 is approximately equal to the height of the rail 255. As such, when the rail 255 is seated within the guide track 260, a top surface or a fourth work piece support surface 270 of the rail 255 (FIG. 3) is coplanar with the first, second, and third work piece support surfaces 140, 145, 240, effectively permitting the top surface 270 of the rail 255 to function as a work piece support surface above the cavity 235. The work stop 245 also includes a face 275, oriented perpendicular to the first, second, and third work piece support surfaces 140, 145, 240 and parallel to the first and second fence assemblies 150, 155, against which the work piece 250 is abutted.

Each of the handle assemblies 220 also includes a lock 280 for securing the work stop 245 in a desired position in the guide track 260 for positioning the work piece 250 against the first and second fence assemblies 150, 155. In the illustrated embodiment of the miter saw 100, the lock 280 is configured as a threaded fastener (e.g., a wing screw) received within a threaded bore 290 (FIG. 4) in the handle 225. The wing screw 280 protrudes through a longitudinal slot 295 in the rail 255 (FIG. 3), thereby permitting sliding movement of the rail 255 within the guide track 260 while the wing screw 280 remains stationary in the handle 225. A head of the wing screw 280 is engageable with the top surface 270 of the rail 255 for securing the rail 255 (and therefore the remainder of the work stop 245) in a fixed fore-aft position relative to the base 125 and the first and second fence assemblies 150, 155.

Figure 5:
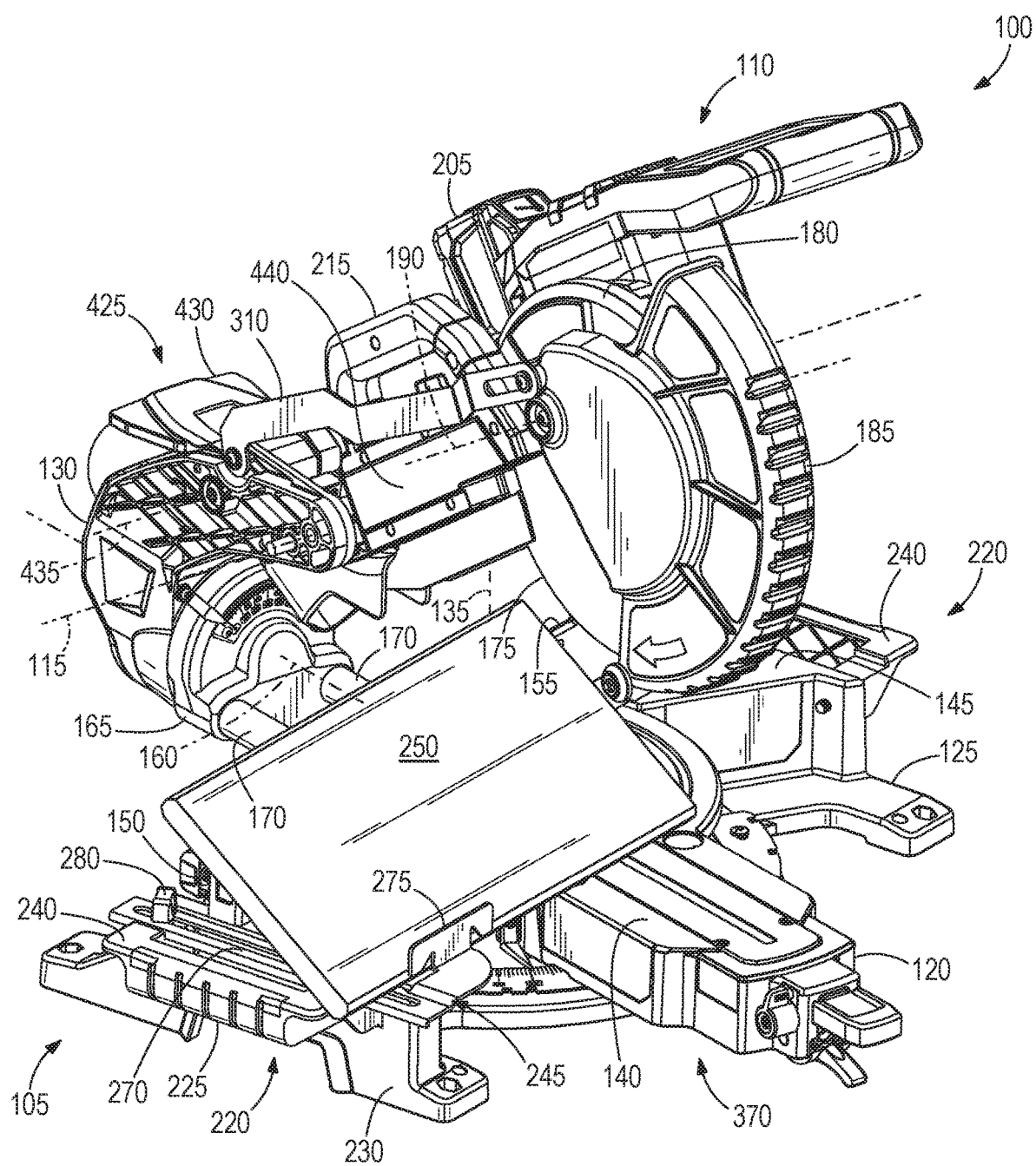
FIG. 5 is a front perspective view of the miter saw of FIG. 1, illustrating a work piece positioned between the work stop and a fence assembly of the miter saw.

In operation of the miter saw 100, the handle assemblies 220 are usable to extend the effective working surface of the turntable 120 and the base 125. For example, depending on its length, a work piece 250 (FIG. 5) may be supported upon the first and second work piece support surfaces 140, 145 of the turntable 120 and the base 125, respectively, and the third and fourth work piece support surfaces 240, 270 of at least one of the handle assemblies 220 attached to the base 125. If it is desired to use the work stop 245 of one or both of the handle assemblies 220, the user may adjust the position of the rail 255 within the guide track 260 to a location that coincides with abutment of the face 275 against the work piece 250. Once the work stop 245 is positioned at the desired location, the wing screw 280 is tightened in a locking (e.g., clockwise) direction for securing the rail 255 (and therefore the remainder of the work stop 245) to the handle 225. In particular, when tightening the wing screw 280, a head of the wing screw 280 clamps the rail 255 against the handle 225, thereby affixing the work stop 245 to the handle 225. Accordingly, the work piece 250 is secured from movement in the fore-aft direction relative to the turntable 120 and base 125 in preparation for a cutting operation on the work piece 250. Upon completion of the cutting operation, the work piece 250 may be simply removed from the miter saw 100. Because the work stop 245 is still secured to the handle assembly 220, another work piece may be positioned to abut the face 275, the fence assemblies 150, 155, and at least one of the work piece support surfaces 140, 145, 240, 270 to provide a consistent repetition of the desired cutting operation.

Figure 6:
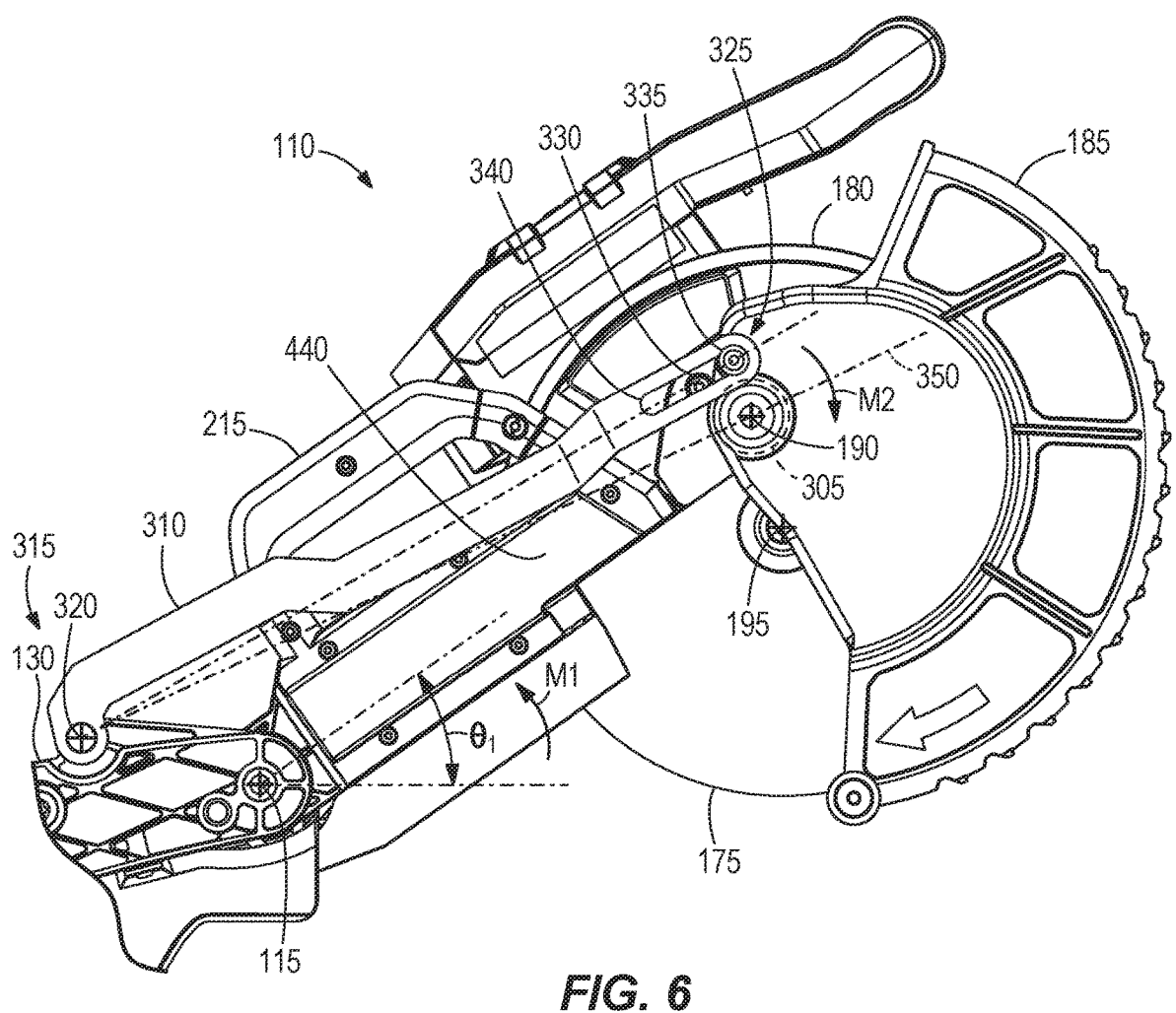
FIG. 6 is a side view of a portion of the miter saw of FIG. 1, illustrating a lower blade guard in a first position relative to a saw blade of the miter saw.
Figure 7:
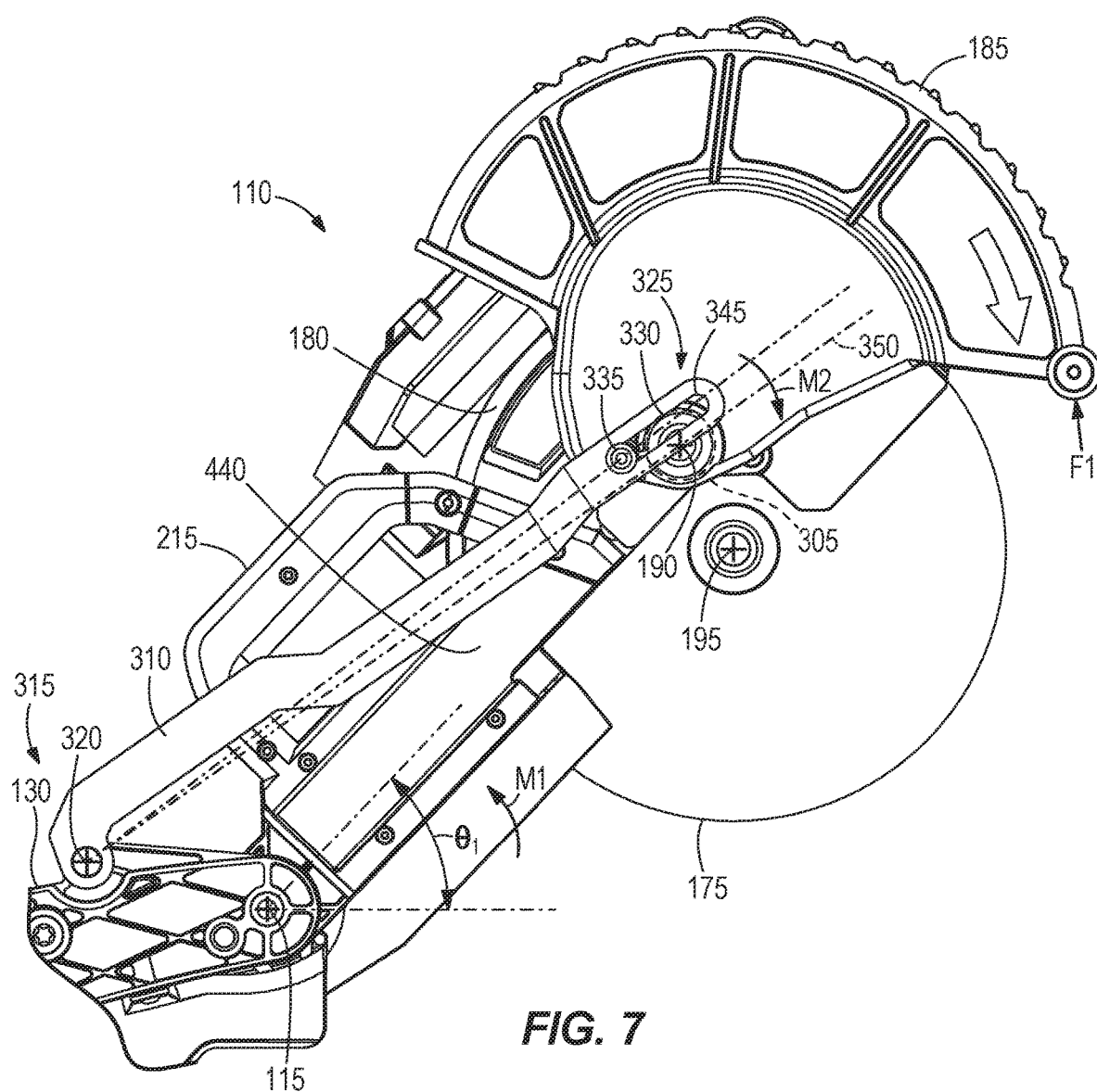
FIG. 7 is a side view of a portion of the miter saw of FIG. 1, illustrating the lower blade guard in a second position relative to the saw blade of the miter saw.
Figure 8:
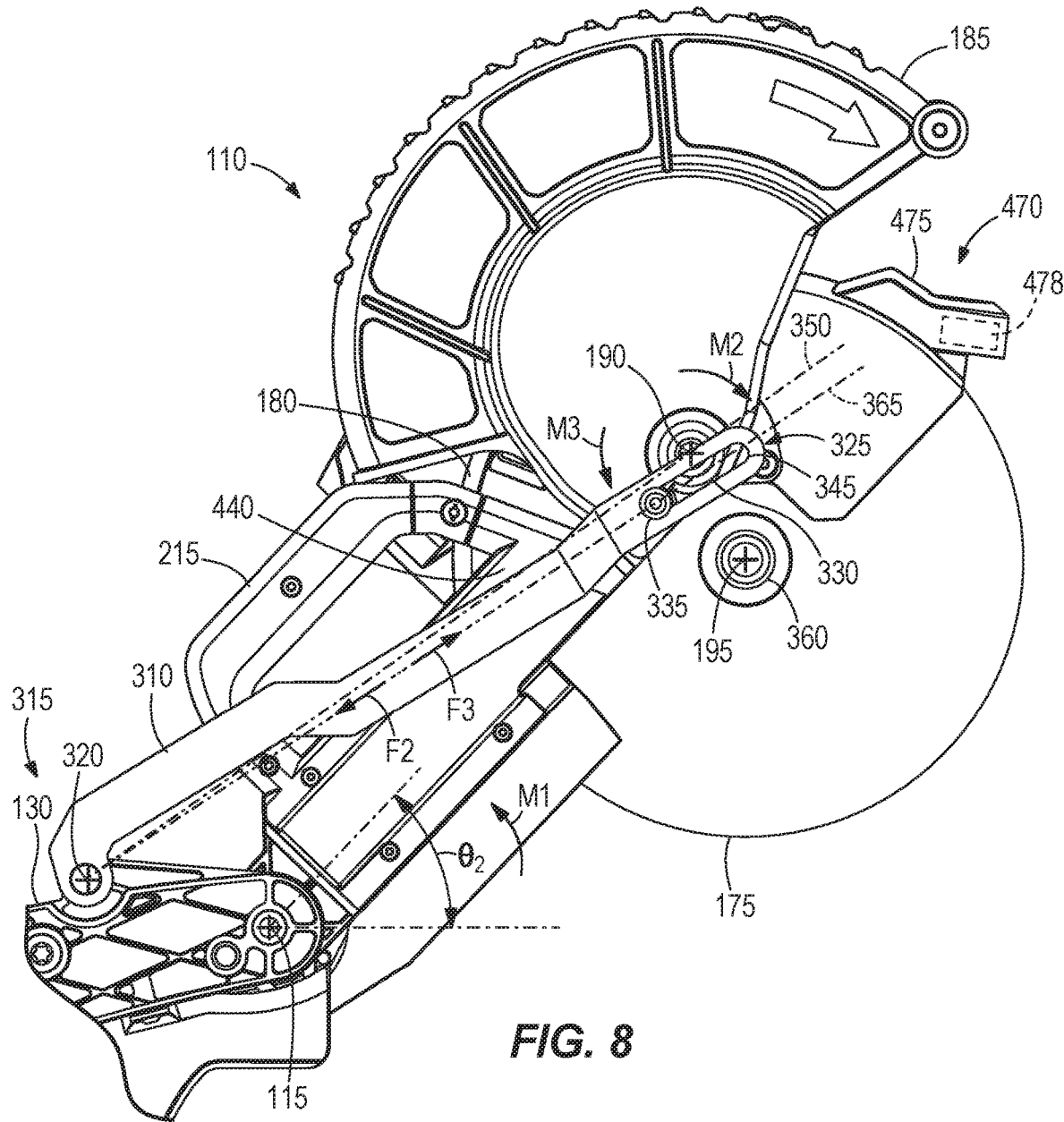
FIG. 8 is a side view of a portion of the miter saw of FIG. 1, illustrating the lower blade guard in a third position relative to the saw blade of the miter saw.

With reference to FIGS. 6-8, the saw unit 110 includes a first torsion spring 300 (FIG. 2) concentric with the first axis 115 and a second torsion spring 305 (FIG. 6) concentric with the fourth axis 190. The first torsion spring 300 provides a first biasing rotational force, or a first moment M1, acting on the saw unit 110 in a counter-clockwise direction from the frame of reference of FIG. 6 to bias the saw unit 110 away from the turntable 120 toward a fully raised position, shown in FIG. 6. The second torsion spring 305 provides a second biasing rotational force, or a second moment M2, acting on the lower blade guard 185 in a clockwise direction from the frame of reference of FIG. 6 to bias the lower blade guard 185 toward a lowered position to cover a lower portion of the saw blade 175.

The miter saw 100 also includes a rigid linkage 310 having a rear end 315 pivotably coupled to the bevel arm 130 about a horizontal pivot axis 320 that is parallel with the chopping axis 115. The linkage 310 also includes a front end 325 having a slot 330 in which a protrusion 335 extending from the lower blade guard 185 extends. In the illustrated embodiment of the miter saw 100, the protrusion 335 is a fastener (e.g., a screw, bolt, rivet, etc.) anchored to the lower blade guard 185. Alternatively, the protrusion 335 may be integrally formed with the lower blade guard 185 as a single piece. The slot 330 includes a rear end 340 and an opposite front end 345 (FIG. 7) between which the protrusion 335 may slide. In the illustrated embodiment, a neutral line 350 intersects and defines a distance between the horizontal pivot axis 320 and the fourth axis 190.

In operation, the linkage 310 may function as a temporary restraining mechanism for holding the lower blade guard 185 in a raised position (FIG. 8), without any input from the operator of the miter saw 100, to facilitate easy removal and replacement of the saw blade 175 by providing unimpeded access to an arbor 360 (FIG. 8) of the saw unit 110. When the saw unit 110 is in the fully raised position defining a first angle θ1 of the saw unit 110 relative to a horizontal plane, the lower blade guard 185 can be rotated about the fourth axis 190 in response to application of a first force F1 by the operator against the second moment M2 imparted by the second torsion spring 305, causing the protrusion 335 to slide within the slot 330 in the linkage 310, until the protrusion 335 abuts the rear end 340 of the slot 330 (FIG. 7). In this position of the lower blade guard 185, the protrusion 335 is located above the neutral line 350, and cannot move below the neutral line 350 due to the engagement between the protrusion 335 and the rear end 340 of the slot 330.

Then, as the operator continues to exert the force F1 on the lower blade guard 185, the saw unit 110 is lowered by the operator to a second angle θ2 (FIG. 8), which is less than the first angle θ1, to create a gap between the protrusion 335 and the rear end 340 of the slot 330. Thereafter, the operator continues to raise the lower blade guard 185 until the protrusion 335 crosses the neutral line 350 and contacts the rear end 340 of the slot 330, at which time the operator may release the saw unit 110 and the lower blade guard 185. Upon releasing the saw unit 110, the first moment M1 biases the saw unit 110 towards the fully raised position shown in FIG. 7, but the saw unit 110 cannot physically move to the fully raised position because the protrusion 335 is abutted with the rear end 340 of the slot 330. As a result, the protrusion 335 applies a second force F2 to the linkage 310 through a line of action 365 intersecting the horizontal pivot axis 320 of the linkage 310. However, because the linkage 310 is rigid, it applies a reaction force F3 to the protrusion 335 along the same line of action 365 in the opposite direction. Because the reaction force F3 is located below the neutral line 350 and spaced from the horizontal pivot axis 320 of the lower blade guard 185, a third moment M3 is created in a counter-clockwise direction from the reference frame of FIG. 8 that is equal and opposite to the second moment M2. As such, the lower blade guard 185 is maintained in the raised position shown in FIG. 8 for unimpeded access to the arbor 360 of the saw unit 110 to remove and replace the saw blade 175.

To return the lower blade guard 185 to the lowered position from the raised position shown in FIG. 8, the operator of the miter saw 100 needs only to further lower the saw unit 110 a slight amount from its orientation in FIG. 8 towards the turntable 120, thus creating a gap between the rear end 340 of the slot 330 and the protrusion 335. Once this gap is created, the reaction force F3 is removed from the protrusion 335, creating an imbalance of forces on the lower blade guard 185 that rotates the lower blade guard 185 to the lowered position of FIG. 6 under the influence of the second moment M2, which is created by the second torsion spring 305 acting on the lower blade guard 185. In the lowered position shown in FIG. 6, the protrusion 335 is again positioned above the neutral line 350.

Figure 9:
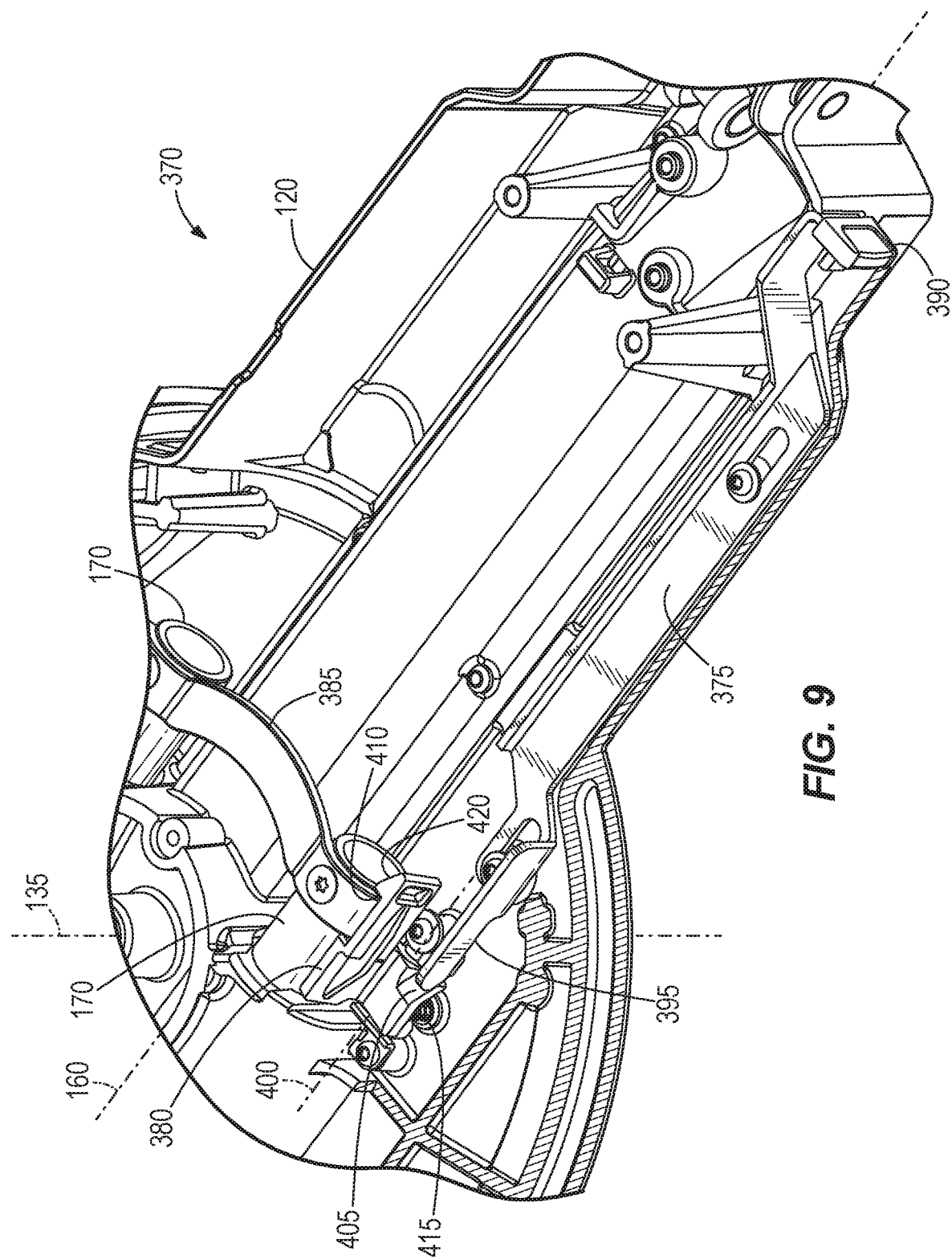
FIG. 9 is a bottom perspective view of a portion of the miter saw of FIG. 1, illustrating a guide rail lock subassembly in a locked position.
Figure 10:
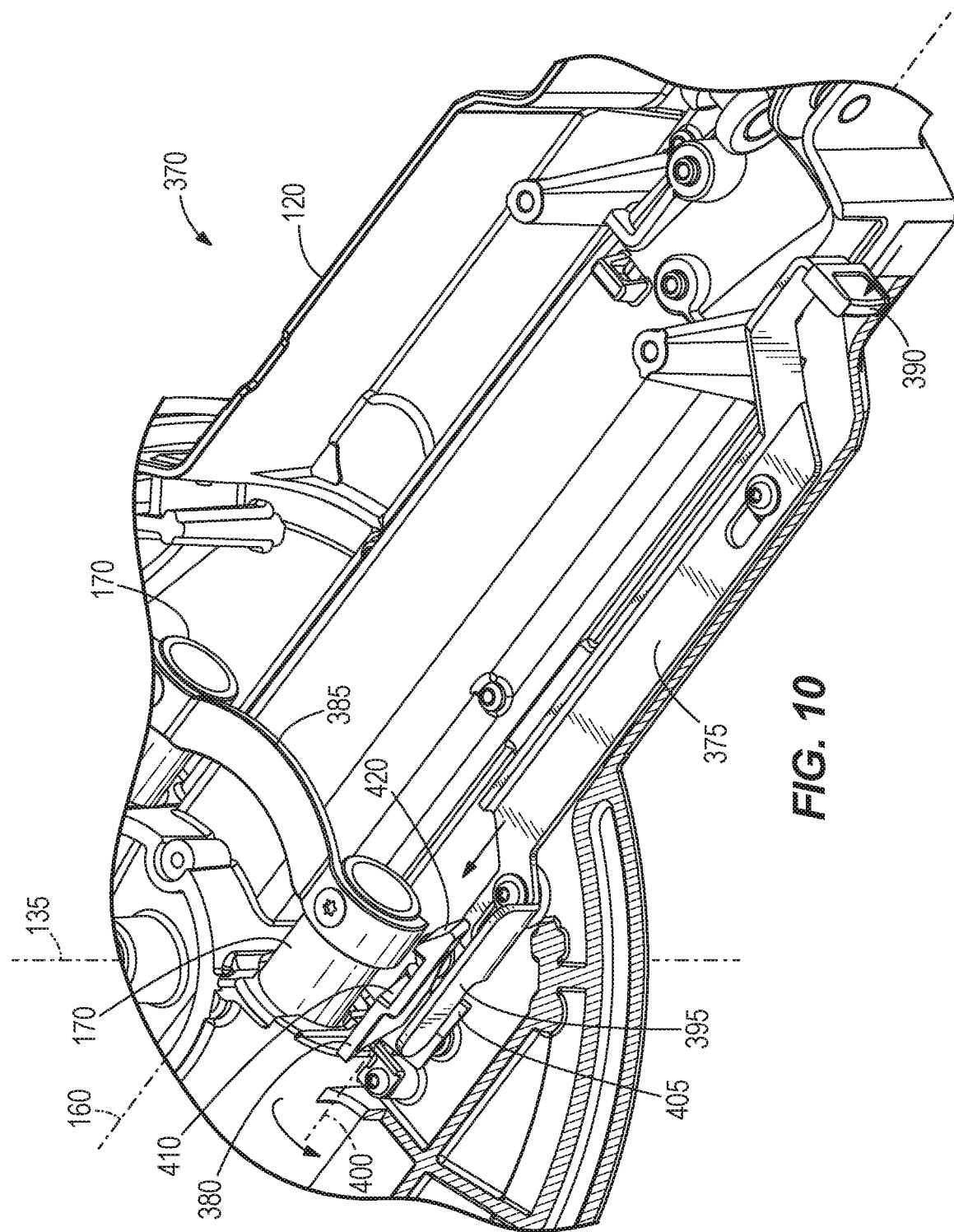
FIG. 10 is a bottom perspective view of the portion of the miter saw of FIG. 9, illustrating the guide rail lock subassembly in an unlocked position.

With reference to FIGS. 9 and 10, the miter saw 100 includes a guide rail lock mechanism 370 for selectively maintaining the saw unit 110 in an optimal location relative to the turntable 120 for making repetitive chop cuts on one or more work pieces. The guide rail lock mechanism 370 includes an actuator arm 375 and a latch 380 for locking the guide rails 170 in a particular location along the bevel axis 160 relative to the turntable 120. The ends of the respective guide rails 170 opposite the bevel arm mount 165 are connected by a guide bracket or stop 385 that functions as a stop to limit the extent to which the guide rails 170 may be extended from the turntable 120.

The actuator arm 375 is slidable relative to the turntable 120 in a direction parallel with the bevel axis 160, and includes a user-actuated tab 390 that extends laterally from the underside of the turntable 120. The actuator arm 375 also includes a finger 395 opposite the user actuated tab 390.

The latch 380 is pivotably coupled to the turntable 120 about a fifth axis 400 that is parallel with the bevel axis 160, and includes a cam surface 405 that is selectively engageable by the finger 395. In other embodiments, the fifth axis 400 may be perpendicular to the bevel axis 160. The latch 380 also includes a locking groove 410 in which a portion of the guide bracket 385 is receivable. The latch 380 is biased towards the guide bracket 385 by a spring 415 (FIG. 9) located beneath the cam surface 405. In other embodiments, the latch 380 may be biased away from the guide bracket 385 by the spring 415. The latch 380 also includes an angled surface 420 that is configured to initially engage with the guide bracket 385 as the guide bracket 385 slides into engagement with the latch 380.

The guide rail lock mechanism 370 is positionable in either a locked position (FIG. 9) or an unlocked position (FIG. 10). In the locked position, a portion of the guide bracket 385 is received within the locking groove 410 to inhibit the guide rails 170, and ultimately the saw unit 110, from translating relative to the turntable 120 along the bevel axis 160. As such, the saw unit 110 is optimally positioned relative to the turntable 120 for making chop cuts. In other words, the saw blade 175 is positioned relative to the turntable 120 in such a manner to optimize the cutting height of the saw blade 175 when the saw unit 110 is pivoted about the chopping axis 115 toward the turntable 120.

To switch the guide rail lock mechanism 370 into the unlocked position, the user actuated tab 390 is pushed towards the latch 380, thereby causing the finger 395 on the actuator arm 375 to engage and slide along the cam surface 405 to pivot the latch 380 away from the guide bracket 385. In the embodiment of the spring 415 biasing the latch 380 away from the guide bracket 385, the user actuated tab 390 is utilized to pivot the latch 380 towards the guide bracket 385. Once the latch 380 disengages the guide bracket 385, the guide rails 170, and ultimately the saw unit 110, can translate relative to the turntable 120 along the bevel axis 160 to resume sliding operation of the saw unit 110. In the illustrated embodiment, friction between the cam surface 405 and finger 395 maintains the latch 380 in the unlocked position until the user-actuated tab 390 is pulled away from the latch 380, thereby disengaging the finger 395 from the cam surface 405, and allowing the latch 380 to pivot back into the biased, locked position.

Figure 11:
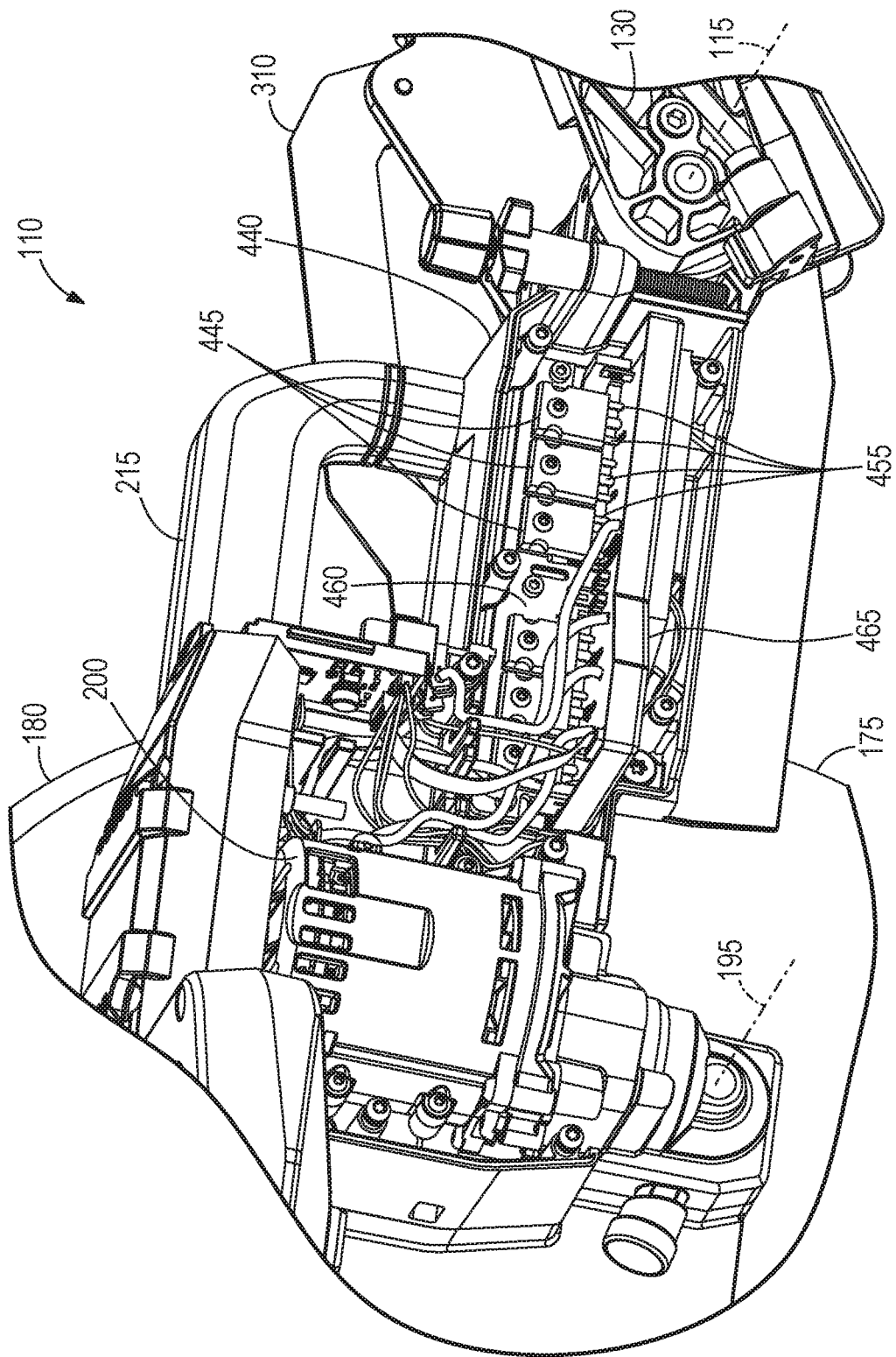
FIG. 11 is an enlarged view of the miter saw of FIG. 1, with portions removed, illustrating a brushless motor and associated power electronics.

With reference to FIG. 11, the illustrated saw unit 110 includes a saw arm 440 that is substantially hollow and supports power electronics (e.g., field-effect transistors or FETs 445) that are electrically connected to a first circuit board (e.g., a power printed circuit board or power PCB 450) via electrical leads 455 for powering the brushless motor 200. In the illustrated embodiment, the FETs 445 are directly attached to a bracket 460, which in turn is directly attached to a portion of the saw arm 440. Accordingly, the FETs 445 are positioned remotely from the motor 200. In the illustrated embodiment, the bracket 460 is made from aluminum, but in other embodiments, the bracket 460 may be made from other materials having a like thermal conductivity. The power PCB 450 is supported within a plate 465, which is attached to the saw arm 440 and in which electrical potting material (not shown) is contained for encapsulating and electrically isolating the power PCB 450 from the saw arm 440.

Although not shown, the brushless motor 200 includes a second circuit board upon which one or more sensors (e.g., Hall-effect sensors) are incorporated for detecting a rotational speed of the motor 200.

During operation of the miter saw 100, a substantial amount of heat is generated by the FETs 445 which, if not regulated, can lead to premature shutoff of the motor 200. Because the FETs 445 are in direct contact with the saw arm 440 via the bracket 460, the saw arm 440 functions as a heat sink for the FETs 445. In particular, heat generated by the FETs 445 conducts through the bracket 460 to reach the saw arm 440, where it is dissipated through the entire mass of the saw arm 440, effectively using the saw arm 440 as a heat sink. In addition, because the saw arm 440 is in direct contact with the bevel arm 130 (through the joint defining the chopping axis 115) the bevel arm 130 may also function as a heat sink for the FETs 445. By using the entire mass of the saw arm 440 and/or the bevel arm 130 as a heat sink, heat from the FETs 445 is more effectively and efficiently dissipated, permitting continued operation of the miter saw 100 without concern of premature shutoff of the motor 200.

Figure 12:
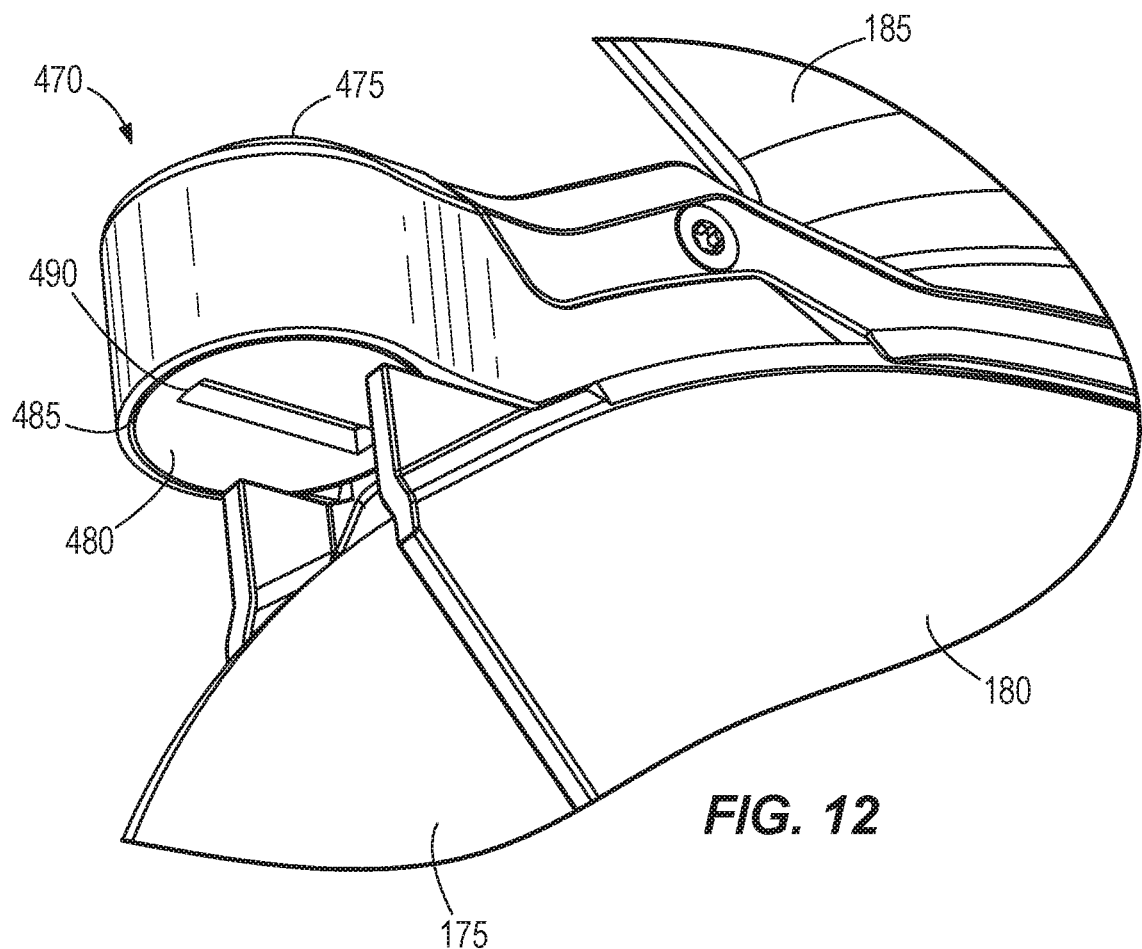
FIG. 12 is a perspective view of a cut line indicator of the miter saw of FIG. 1 coupled to an upper blade guard.
Figure 13:
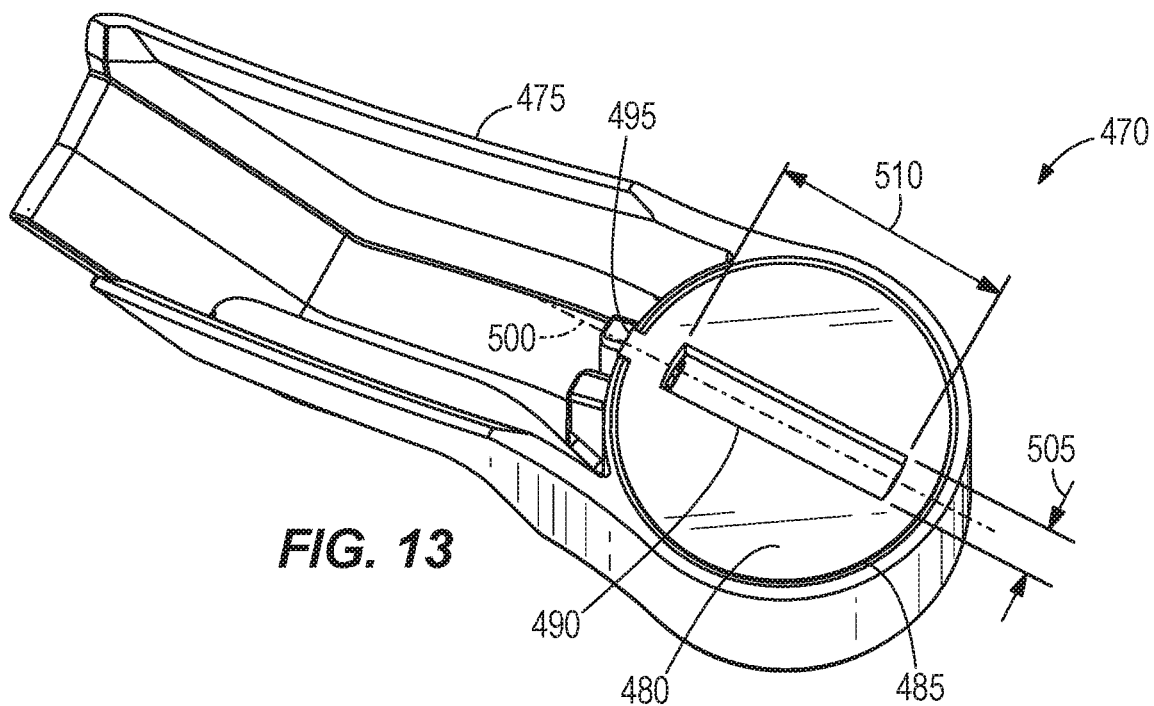
FIG. 13 illustrates a portion of the cut line indicator of FIG. 12.
Figure 14:
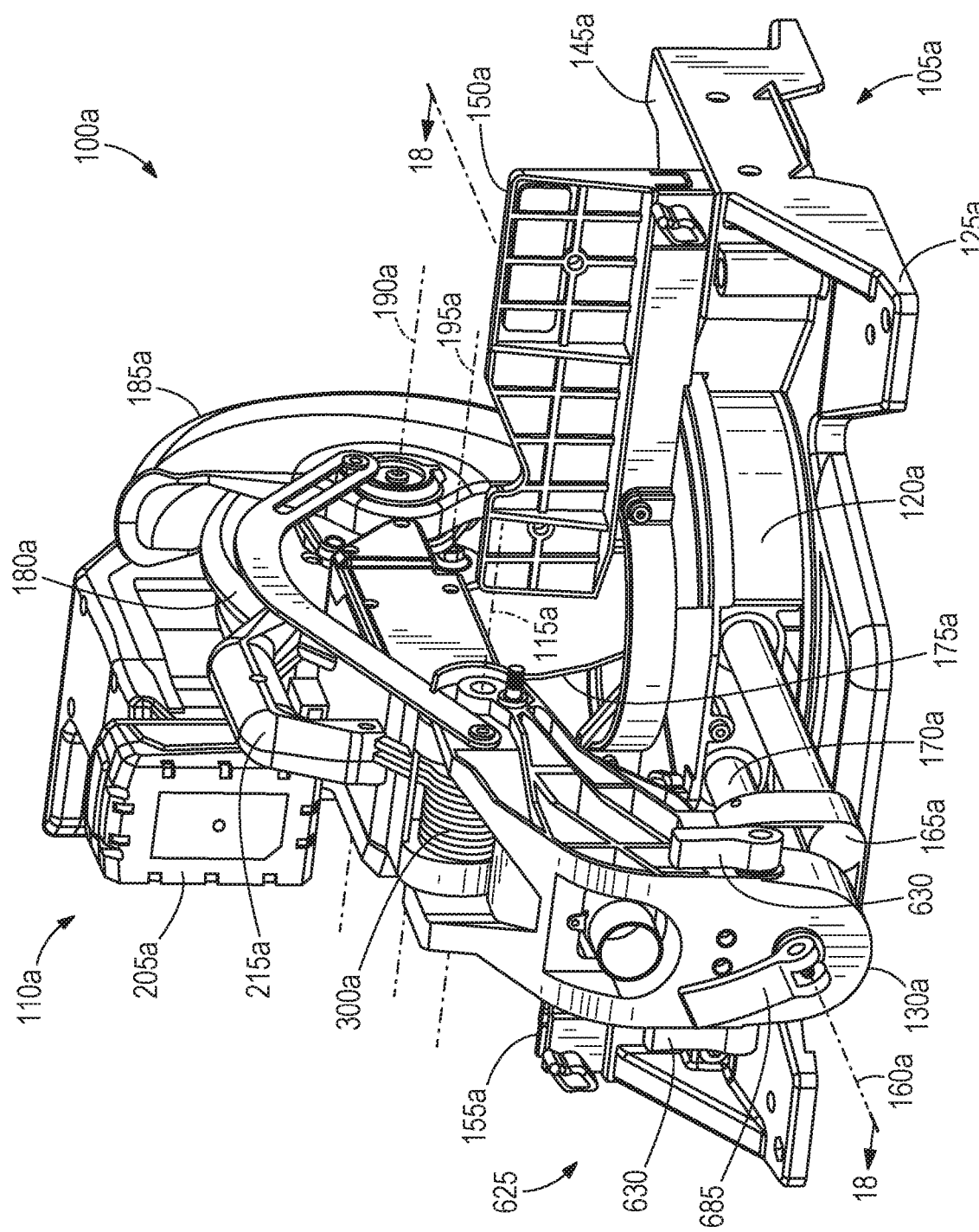
FIG. 14 is a rear perspective view of a bevel angle lock and detent override system of a miter saw according to another embodiment of the invention.
Figure 15:
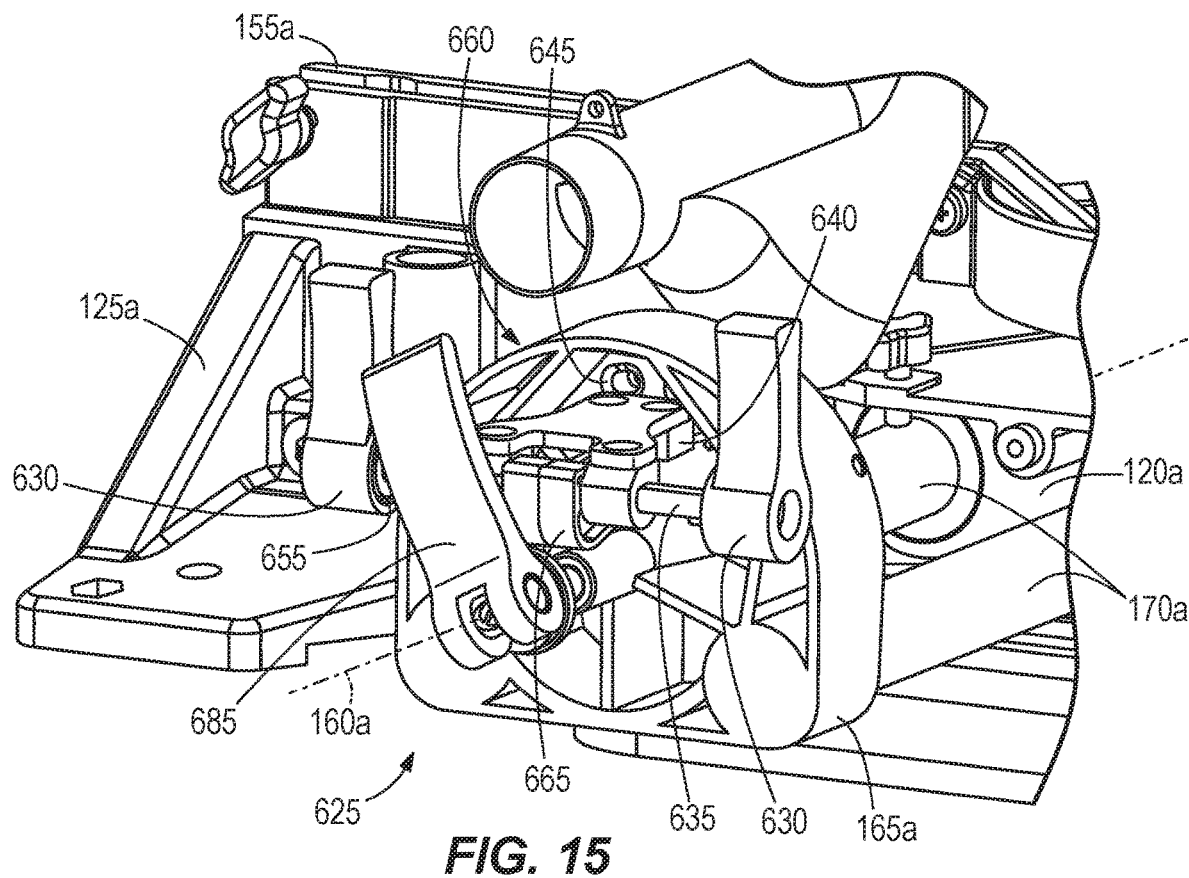
FIG. 15 is a rear cutaway view of the miter saw of FIG. 14, illustrating a bevel angle detent system and portions of a bevel angle detent override system.
Figure 16:
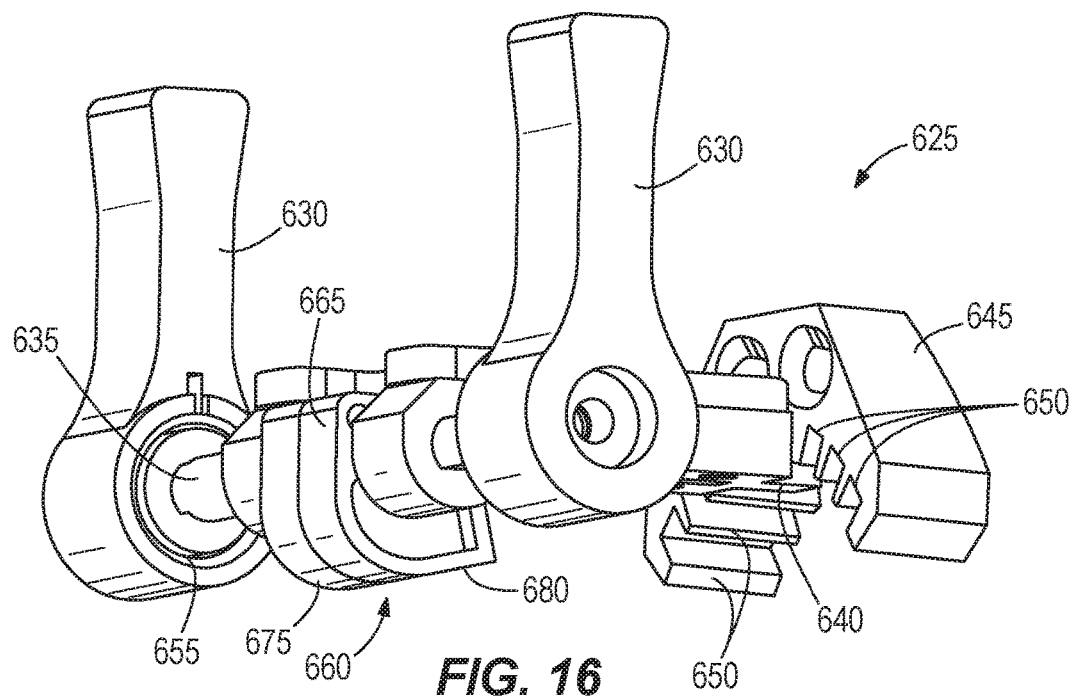
FIG. 16 is a perspective view of the bevel angle detent system and bevel angle detent override system of FIG. 15.
Figure 17:
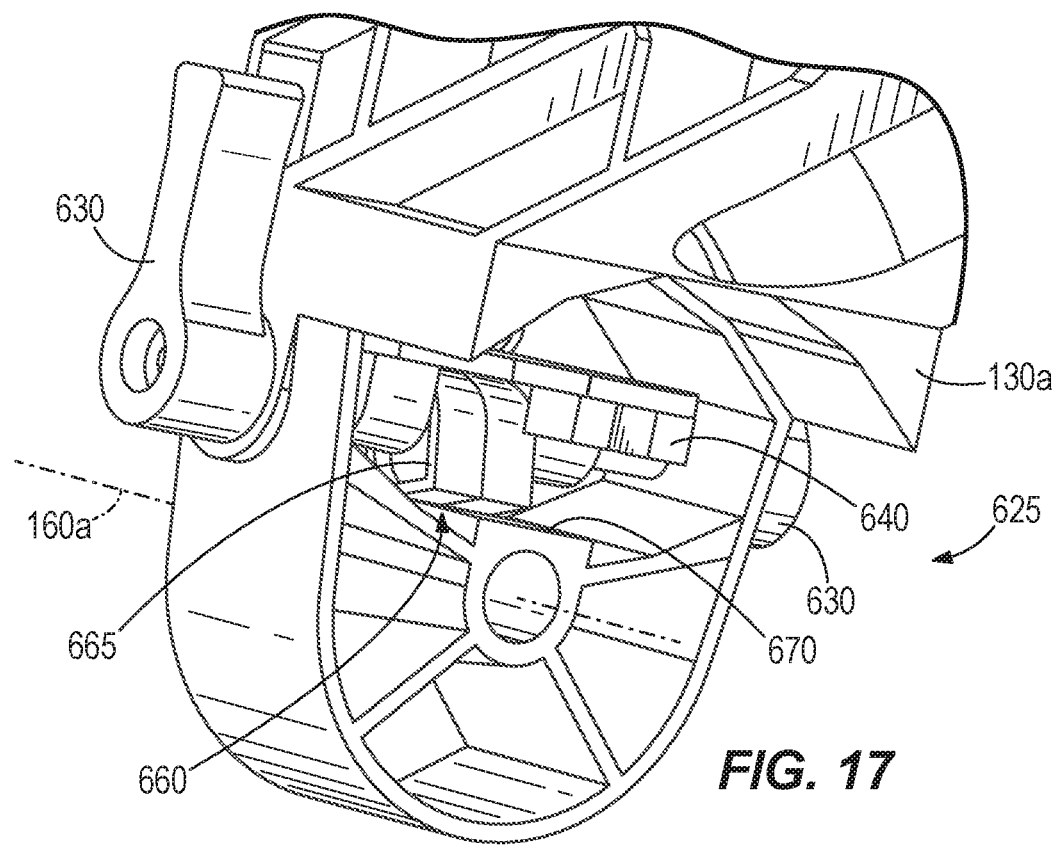
FIG. 17 is a perspective view of a portion of a bevel arm of the miter saw of FIG. 14, with portions of the bevel angle detent system and bevel angle detent override system attached.

With reference to FIGS. 8, 12, and 13, the miter saw 100 includes a cut line indicator 470 coupled to the upper blade guard 180 and positioned adjacent the saw blade 175. In particular, the cut line indicator 470 includes a housing 475 fixed to the upper blade guard 180 and a light source positioned within the housing 475. The light source, for example, is a light emitting diode (e.g., LED 478) that is electrically activated in response to a user depressing the trigger 210. The LED 478 is oriented within the housing 475 to direct light towards portions of the saw blade 175 and the first work piece support surface 140 either when the saw unit 110 is in the fully raised position (FIG. 7) or when the saw unit 110 is performing a cut on a work piece. Stated another way, a portion of the saw blade 175 is positioned between the first work piece support surface 140 and the LED 478.

The cut line indicator 470 also includes a cover 480 (FIGS. 12 and 13) positioned within an aperture 485 in the housing 475 to encapsulate the LED 478 (FIG. 8) within the housing 475. The cover 480 is configured as an opaque cylindrical disk including a slot 490 and an alignment rib 495. The rib 495 is received within a corresponding slot contiguous with the aperture 485 to secure the cover 480 to the housing 475 (using, for example, a snap fit or an interference fit). The rib 495 also angularly aligns or positions the slot 490 relative to the saw blade 175 so that the cover 480 may only be assembled to the housing 475 in a single orientation to ensure that the slot is aligned with the saw blade 175. In other words, the slot 490 is rectangular and defines a central axis 500 that is aligned with the saw blade 175. Likewise, the central axis 500 of the slot 490 is substantially perpendicular to the rotational axis 195 of the saw blade 175. In the illustrated embodiment, the slot 490 is positioned about 10 mm from the saw blade 175. Alternatively, the slot 490 may be positioned between about 5 millimeters and about 15 millimeters from the saw blade 175. In some embodiments, the slot 490 includes a width 505 between about 2 millimeters and about 10 millimeters. In other embodiments, the width 505 may be between about 3 millimeters and about 7 millimeters. In yet other embodiments, the width 505 may be between about 4 millimeters and about 6 millimeters. In yet other embodiments, the width 505 may be between the maximum width of the saw blade 175 plus one millimeter and the maximum width of the saw blade 175 plus three millimeters. The illustrated saw blade 175 includes a maximum width of about 3 millimeters; however, in other embodiments, the maximum width of the saw blade 175 may between about 2 millimeters and about 4 millimeters. The slot 490 also includes a length 510 between about 25 millimeters and about 35 millimeters.

In operation, the LED 478 of the cut line indicator 470 is illuminated in response to actuation of the trigger 210. In other embodiments, the LED 478 may be manually turned on or off. When the LED 478 is illuminated, light passes through the slot 490 to illuminate opposite sides of the saw blade 175 and the first work piece support surface 140, yet is blocked from passing through the remainder of the cover 480 because the cover 480 is opaque. Because the saw blade 175 is positioned between the LED 478 and the first work piece support surface 140, the saw blade 175 casts a shadow onto a work piece supported on the first work piece support surface 140. As the saw unit 110 is pivoted towards the work piece for a cutting operation, the boundary of the shadow cast onto the work piece is indicative of where on the work piece the saw blade 175 will cut. Moreover, by including the slot 490 in the cover 480, the crispness and accuracy of the shadow cut line is increased compared to a conventional design having a transparent or translucent cover without any such slot like that in the present invention.

With reference to FIGS. 1 and 2, the miter saw 100 also includes a bevel angle lock and detent override system 425 that is similar to the bevel adjustment assembly disclosed in U.S. Pat. No. 7,574,950, the entire contents of which are incorporated herein by reference. In particular, the bevel angle lock and detent override system 425 is adjustable between three positions consisting of a first locked position associated with a predefined bevel angle, an unlocked or detent override position, and a second locked position associated with a non-predefined bevel angle.

In the first locked position, an actuator (e.g., a lever 430) pivotable about a sixth axis 435 is positioned in a first orientation (e.g., as illustrated in FIGS. 1 and 2) to lock or fix the saw unit 110 at a predefined bevel angle (e.g., 22.5, 30, 45, 60 degrees) relative to the base assembly 105. In the unlocked or detent override position, the actuator 430 is rotated from the first orientation into a second orientation to enable movement of the saw unit 110 relative to the base assembly 105 about the bevel axis 160. In the second locked position, the lever 430 is further rotated from the second orientation to a third orientation to lock the saw unit 110 relative to the base assembly 105 at a bevel angle that is not one of the predefined bevel angles available when the lever 430 is in the first locked position.

FIGS. 14-18 illustrate a bevel angle lock and detent override system 625 for a miter saw in accordance with another embodiment of the invention. The bevel angle lock and detent override system 625 may be substituted for the system 425 used in the miter saw 100 of FIG. 1. Therefore, like components have been given like reference numbers plus the letter "a" and only the differences between the bevel angle lock and detent override systems 425, 625 will be discussed in detail.

The bevel angle lock and detent override system 625 is configured to hold the bevel arm 130 in one of a plurality of predefined bevel angles relative to the turntable 120. The bevel angle lock and detent override system 625 includes a pair of actuators 630, a shaft 635 interconnecting the actuators 630, and a finger 640 coupled to the shaft 635 for co-rotation therewith. The system 625 also includes a detent plate 645 affixed to the bevel arm mount 165 having a plurality of recesses 650 that correspond with predetermined bevel angles commonly used for cutting work pieces. Torsion springs 655 are located within the respective actuators 630 for biasing the finger 640 into engagement with one of the recesses 650 in the detent plate 645, thereby placing the system 625 into first locked position associated with a predefined bevel angle.

The bevel angle lock and detent override system 625 also includes a detent override system 660 to maintain the system 625 in the unlocked or detent override position—that is, maintaining the finger 640 disengaged from the detent plate 645. The detent override system 660 includes a cam member 665 coupled for co-rotation with the shaft 635 and a flat 670 defined on an interior surface of the bevel arm 130. The cam member 665 includes a lobe 675 with an increasing radius measured from a rotational axis of the shaft 635 (in a counter-clockwise direction from the frame of reference of FIG. 18) and an adjacent flat 680.

Figure 18:
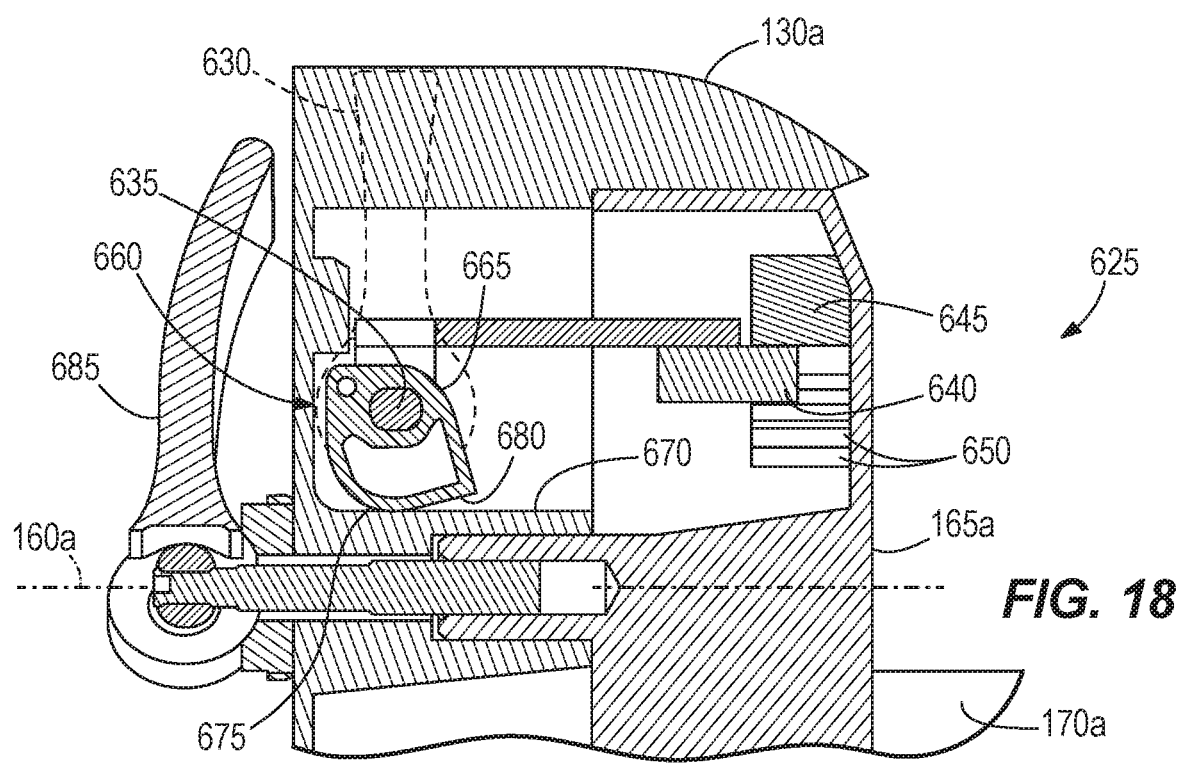
FIG. 18 is a cross-sectional view of the bevel arm and a bevel arm mount of the miter saw of FIG. 14 taken along section 18-18 in FIG. 14, illustrating the bevel angle detent system in an engaged configuration.
Figure 19:
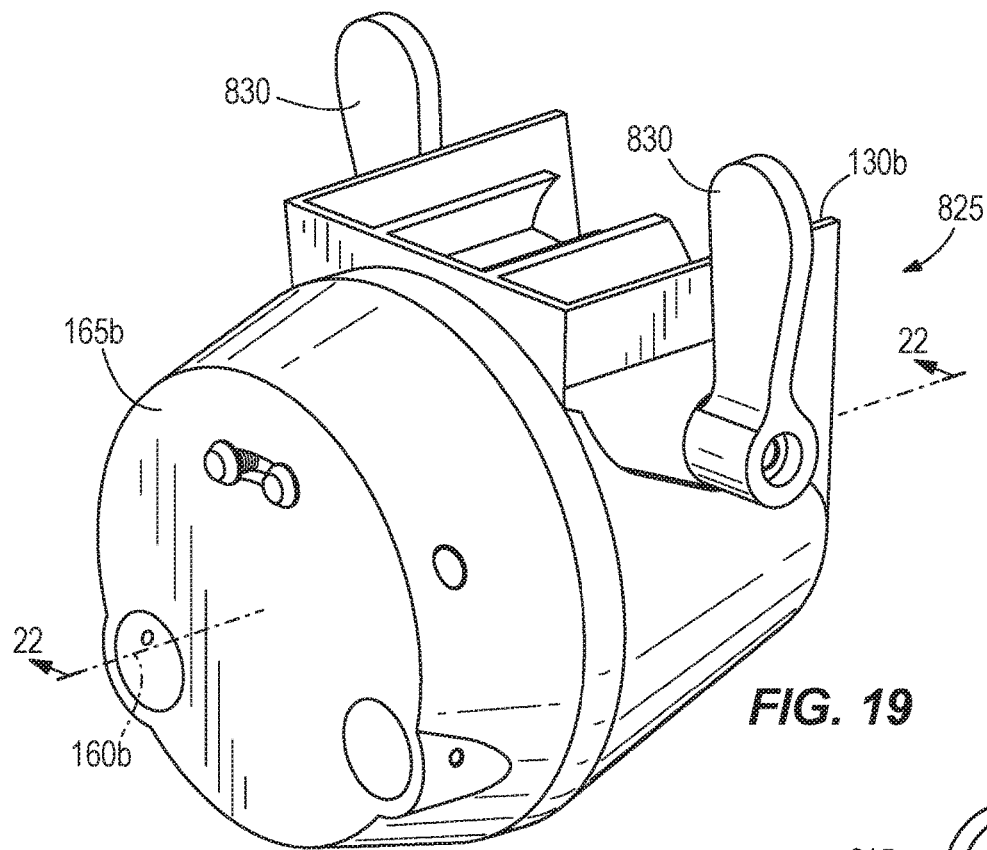
FIG. 19 is a front perspective view of a bevel angle lock and detent override system of a miter saw according to yet another embodiment of the invention.
Figure 20:
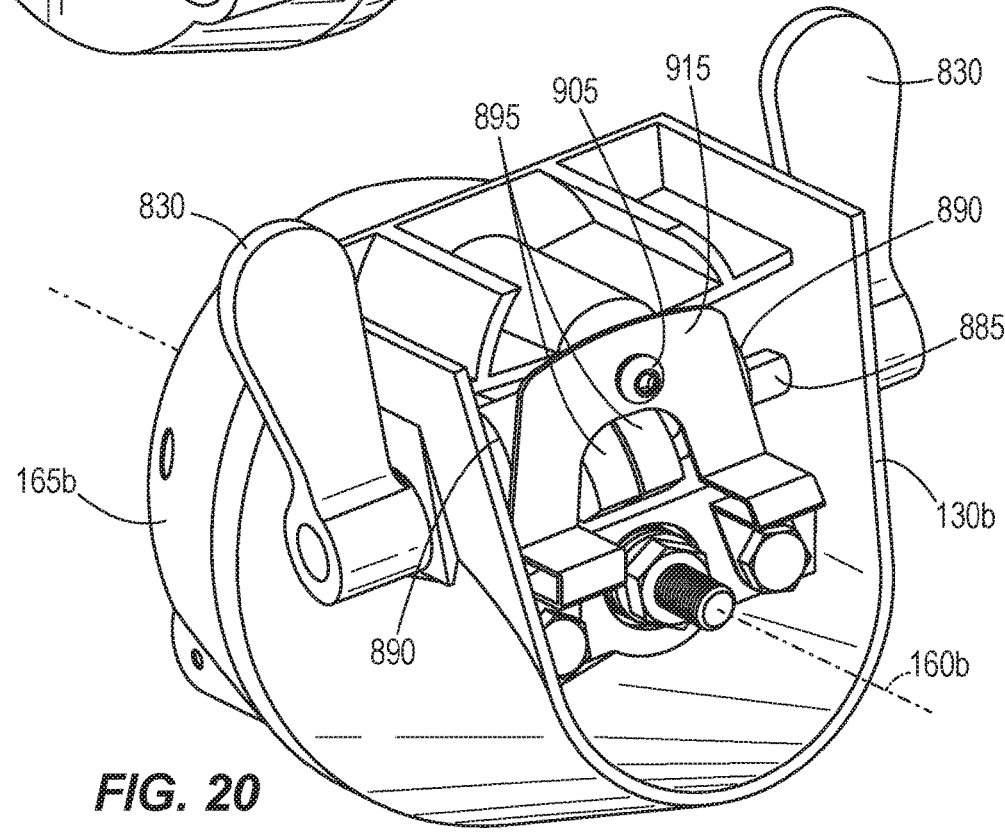
FIG. 20 is a rear perspective view of the bevel angle lock and detent override system of FIG. 19.
Figure 21:
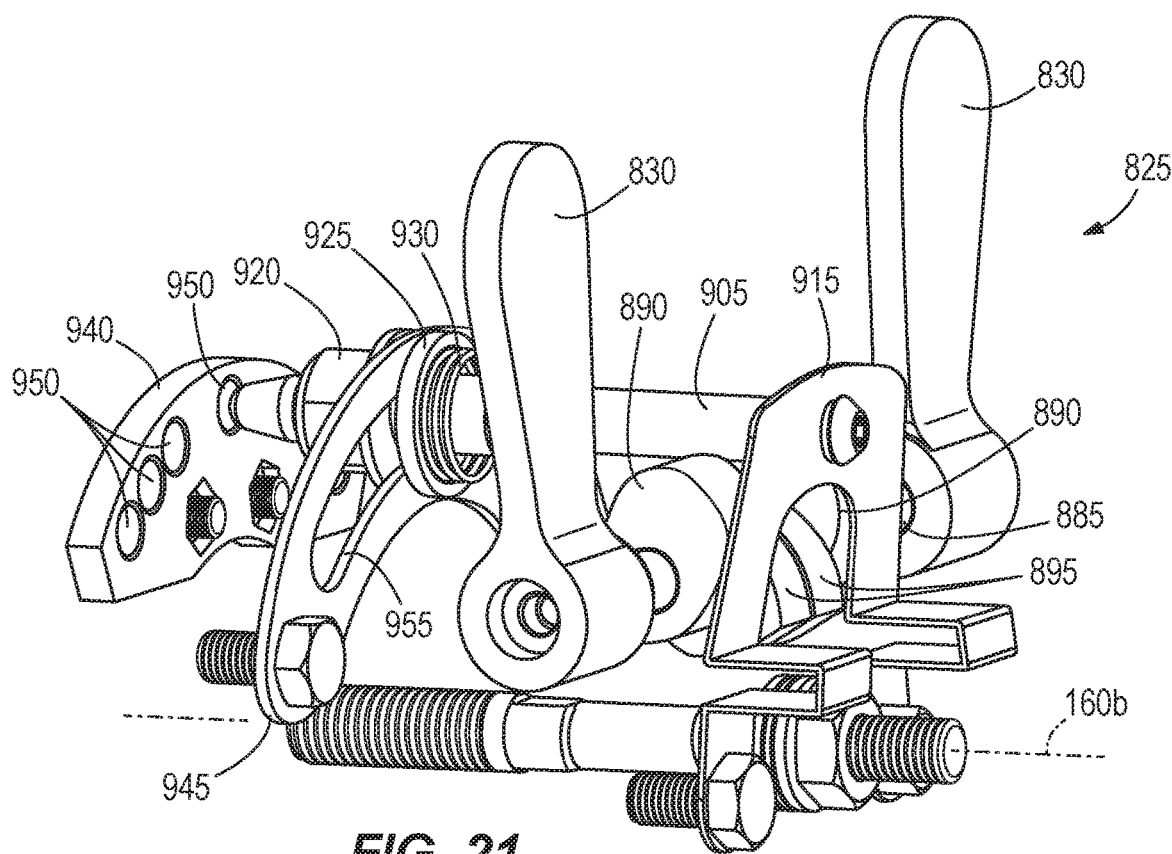
FIG. 21 is a perspective view of internal components of the bevel angle lock and detent override system of FIG. 19.
Figure 22:
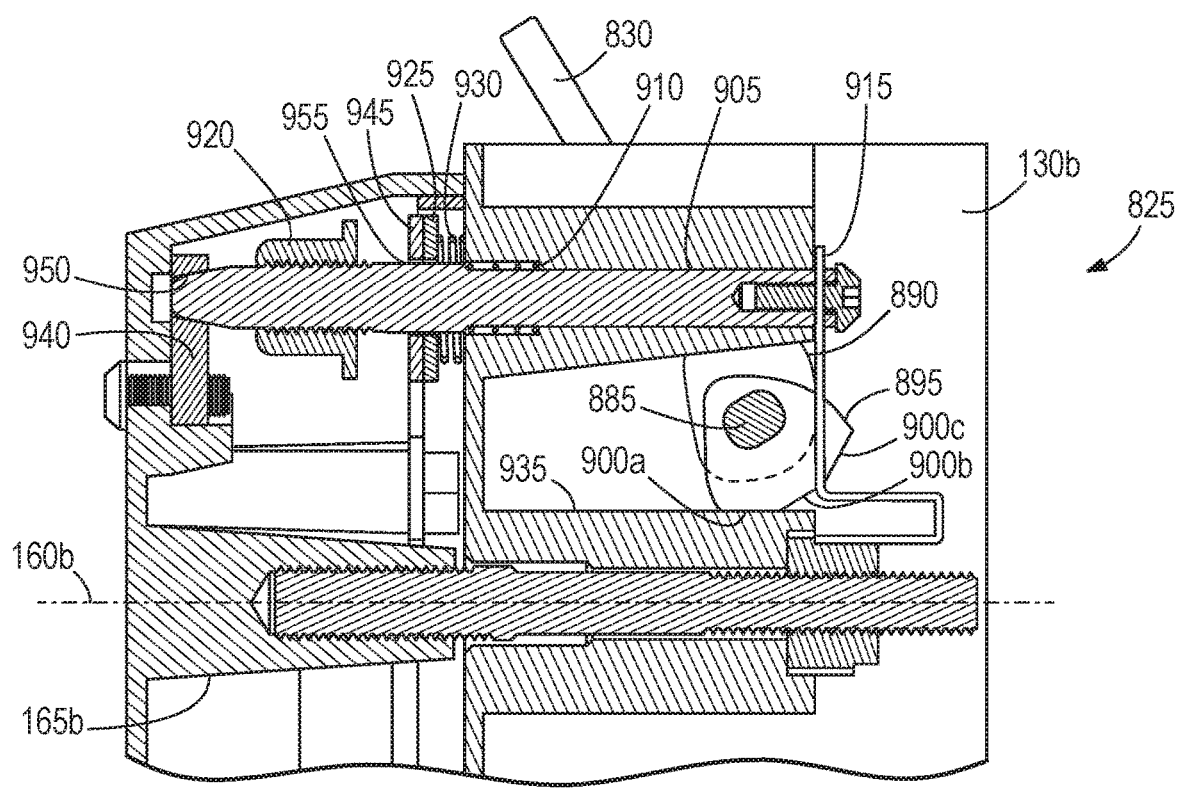
FIG. 22 is a cross-sectional view of the bevel angle lock and detent override system, taken along section 22-22 in FIG. 19, in a locked position associated with a predefined bevel angle.

By pivoting either of the actuators 630 against the bias of the torsion spring 655 in a clockwise direction from the frame of reference of FIG. 18, the finger 640 is disengaged from the detent plate 645 and the lobe 675 frictionally engages the flat 670 on the bevel arm 130 in a progressive manner. The actuators 630 may be pivoted until the flat 680 on the cam member 665 comes into contact with the flat 670, after which further pivoting of the actuators 630 is prevented. Friction between the lobe 675 and/or flat 680 of the cam member 665, and the flat 670 on the bevel arm 130, temporarily holds the system 625 in the unlocked or detent override position. Thereafter, the bevel arm 130 can be pivoted relative to the bevel arm mount 165 and turntable 120 to adjust the saw unit 110 for performing any of a number of different bevel angle cuts, either coinciding with any of the predetermined bevel angles defined by the recesses in the detent plate 645, or uncommon bevel angles between any two adjacent recesses in the detent plate 645. In particular, an over-center locking lever 685 is utilized to clamp the bevel arm 130 against the bevel arm mount 165 to lock the saw unit 110 relative to the base assembly 105 at any non-predefined bevel angle.

To resume use of the system 625, the user needs only to pivot either of the actuators 630 in a reverse (i.e., counter-clockwise) direction to disengage the lobe 675 and/or flat 680 of the cam member 665 from the flat 670 on the bevel arm 130.

FIGS. 19-24 illustrate a bevel angle lock and detent override system 825 for a miter saw in accordance with yet another embodiment of the invention. The bevel angle lock and detent override system 825 is similar to the bevel angle lock and detent override system 425; therefore, like components have been given like reference numbers plus the letter "b" and only the differences between the bevel angle lock and detent override systems will be discussed in detail.

The system 825 includes a pair of actuators 830, a shaft 885 interconnecting the actuators 830, first cam members 890, and second cam members 895 that co-rotate with the shaft 885. The illustrated second cam members 895 are located between the first cam members 890, and the second cam members 895 include cam surfaces 900a, 900b, 900c that define discrete portions of a periphery of the second cam members 895. In the illustrated embodiment, the second cam members 895 are two separate components, but in other embodiments, the second cam members 895 may be integrally formed as a single component.

The system 825 also includes a pin 905 extending between the bevel arm 130 and the bevel arm mount 165 that is axially biased toward the bevel arm mount 165 by a coil spring 910 and a leaf spring 915. A distal end of the leaf spring 915 is attached to a rear end of the pin 905, whereas the other end of the leaf spring 915 is affixed to the bevel arm 130 (e.g., via fasteners). The leaf spring 915 also includes two arms in alignment with the respective first cam members 890. The system 825 also includes a stop 920 threaded to a front portion of the pin 905, a brake member 925 concentric with the pin 905, and a spring 930 biasing the brake member 925 toward the stop 920. The bevel arm 130 includes a flat 935 that extends parallel to the pin 905 and provides a surface for the second cam members 895 to engage.

A detent plate 940 and a pressure plate 945 are both coupled to the bevel arm mount 165. The detent plate 940 includes a plurality of apertures 950 that correspond with predetermined bevel angles commonly used for cutting work pieces (e.g., 38 degrees, 45 degrees, 52 degrees, 90 degrees, etc.). The pressure plate 945 includes a radial slot 955 through which the pin 905 extends. In particular, the pressure plate 945 is located between the stop 920 and the brake member 925, and the stop 920 is located between the detent plate 940 and the pressure plate 945. The brake member 925 is biased towards the pressure plate 945 by the spring 930.

Figure 23:
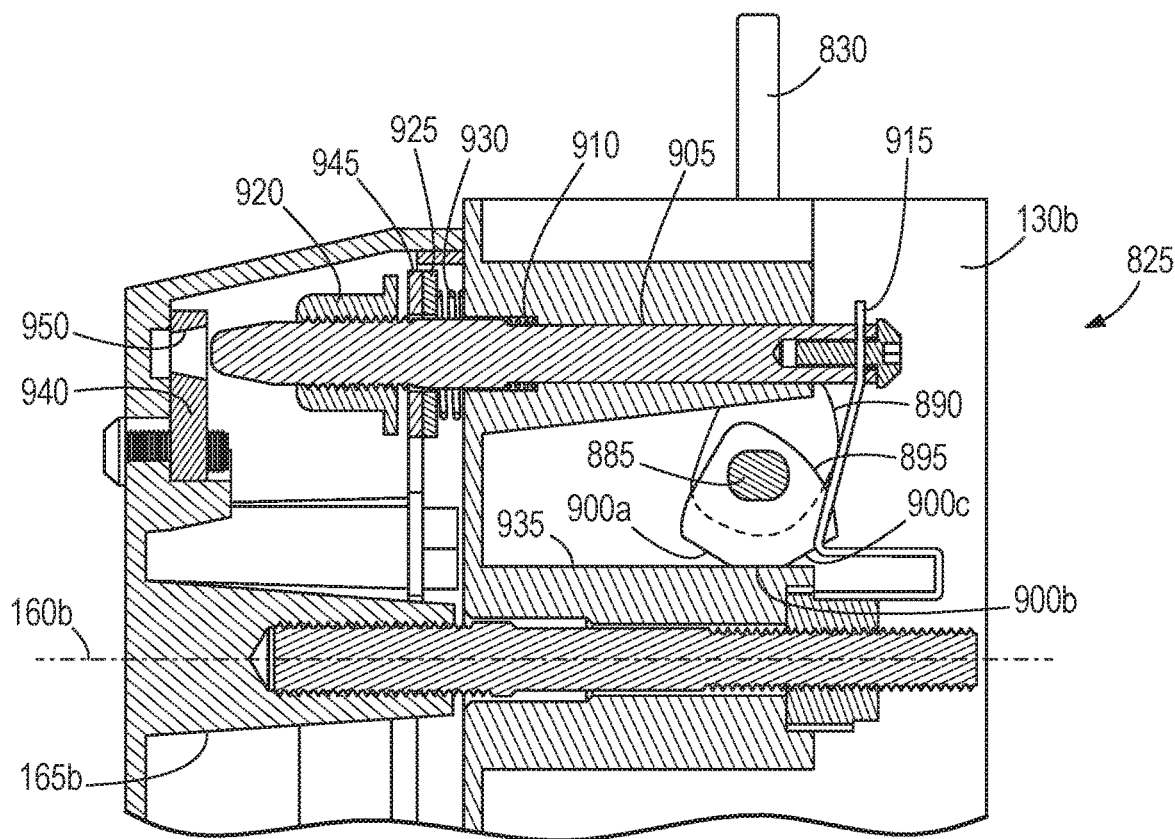
FIG. 23 is a cross-sectional view of the bevel angle lock and detent override system, taken along section 22-22 in FIG. 19, in an unlocked or detent override position.
Figure 24:
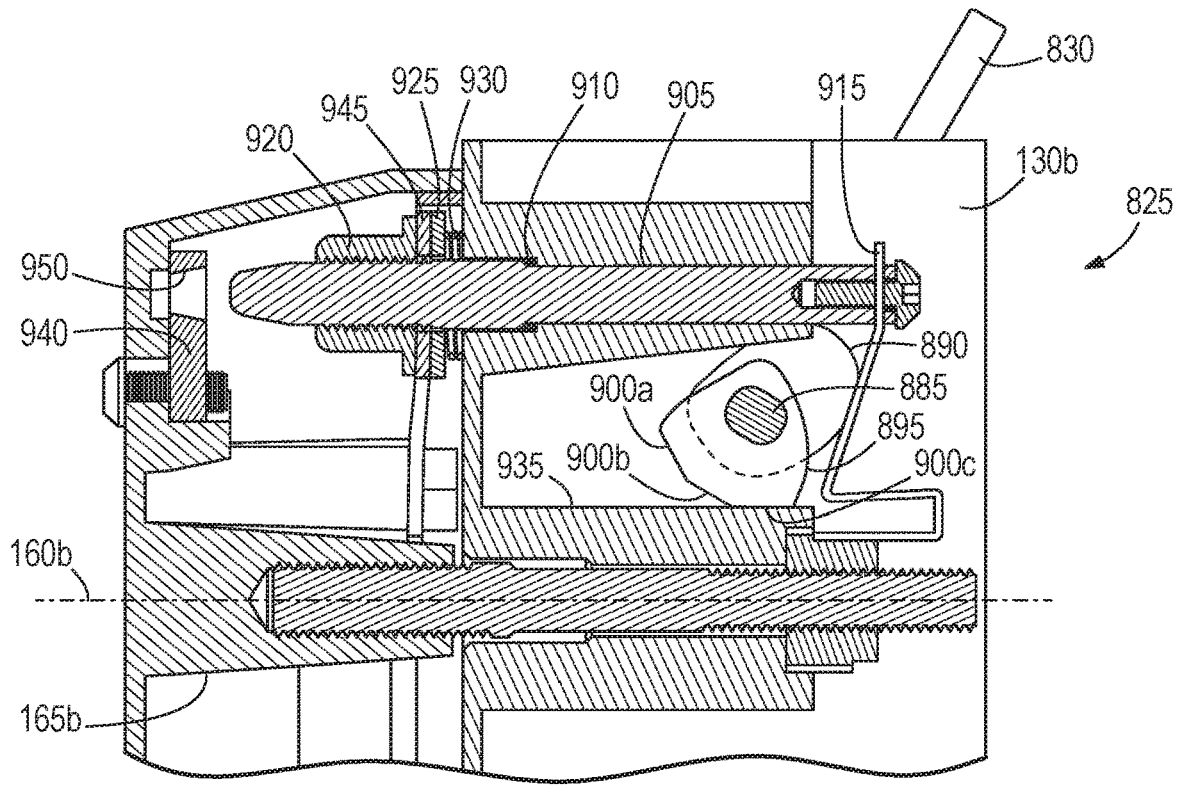
FIG. 24 is a cross-sectional view of the bevel angle lock and detent override system, taken along section 22-22 in FIG. 19, in a locked position associated with a non-predefined bevel angle.

The system 825 is adjustable between three positions consisting of a locked position associated with a predefined bevel angle (FIG. 22), an unlocked or detent override position (FIG. 23), and a locked position associated with a non-predefined bevel angle (FIG. 24). In the locked position of FIG. 22, the actuators 830 are pivoted (from a vertical orientation) towards the bevel arm mount 165, causing the cam surfaces 900a to abut the flat 935. In this position, the compression spring 910 and leaf spring 915 bias the pin 905 into engagement with one of the apertures 950 in the detent plate 940 to lock the bevel arm 130 in a commonly used bevel angle relative to the turntable 120.

In the unlocked or detent override position shown in FIG. 23, the actuators 830 are pivoted toward a vertical orientation, causing the cam surfaces 900b to frictionally engage the flat 935 and causing the first cam members 890 to deflect the leaf spring 915 away from the bevel arm mount 165. Because the rear end of the pin 905 is affixed to the distal end of the leaf spring 915, the pin 905 is also displaced rearward, disengaging the pin 905 from an aperture 950 in the detent plate 940. Also, because the radial dimension of the cam surface 900b is greater than that of the cam surface 900a, the second cam members 895 become interlocked with the flat 935 in an over-center manner, thereby maintaining the pin 905 in a detent override position. In the unlocked or detent override position of FIG. 23, the bevel arm 130 is free to pivot relative to the turntable 120.

In the locked position of FIG. 24, the actuators 830 are further pivoted away from the bevel arm mount 165, causing the cam surfaces 900c to frictionally engage the flat 935 and causing the first cam members 890 to further deflect the leaf spring 915 away from the bevel arm mount 165. The pin 905 is displaced further rearward, causing the stop 920 to frictionally engage the pressure plate 945, which becomes clamped between the brake member 925 and stop 920. Accordingly, the bevel arm 130 is effectively clamped against the bevel arm mount 165. As mentioned above, the system 825 may be adjusted to the locked position shown in FIG. 24 when the desired bevel angle is not one of the predefined bevel angles available in the detent plate 940.

Various features of the invention are set forth in the following claims.

What is claimed is:

1. A miter saw comprising:
   a base assembly;
   a saw unit pivotably coupled to the base assembly, the saw unit including a saw blade and a lower blade guard covering a lower portion of the saw blade; and
   a linkage operable to raise the lower blade guard in a first rotational direction to expose the lower portion of the saw blade as the saw unit is lowered toward the base assembly, the linkage having a rear end pivotably coupled to the base assembly about a first pivot axis and an opposite front end, wherein the length of the linkage between the front and rear ends is fixed, wherein the linkage includes a slot, having a front end and a rear end, proximate the front end of the linkage in which a protrusion of the lower blade guard is received, wherein the lower blade guard is inhibited from moving in the first rotational direction when the lower blade guard is in a first raised position by engagement between the rear end of the slot and the protrusion, and wherein the engagement between the rear end of the slot and the protrusion of the lower blade guard also inhibits movement of the lower blade guard in a second rotational direction opposite the first rotational direction when the lower blade guard is in a second raised position to facilitate changing the saw blade.

2. The miter saw of claim 1, wherein the saw unit is pivotably coupled to the base assembly about a second pivot axis, and wherein the miter saw further comprises a first biasing member operable to apply a first moment to the saw unit about the second pivot axis in the first rotational direction to raise the saw unit from a lowered position to a fully raised position.

3. The miter saw of claim 2, wherein the lower blade guard is pivotable about a third pivot axis, and wherein the saw unit further comprises a second biasing member operable to apply a second moment to the lower blade guard about the third pivot axis in the second rotational direction to cover the lower portion of the saw blade.

4. The miter saw of claim 3, wherein the protrusion is biased into engagement with the front end of the slot by the second moment when the saw unit is in the fully raised position, and wherein a neutral line intersecting the first and third pivot axes is located between the protrusion and the base assembly when the saw unit is in the fully raised position.

5. The miter saw of claim 4, wherein the protrusion is engageable with the rear end of the slot, while remaining above the neutral line, in response to the lower blade guard being pivoted about the third pivot axis against the bias of the second biasing member.

6. The miter saw of claim 5, wherein the protrusion is able to shift below the neutral line, while remaining engaged with the rear end of the slot, in response to the saw unit being lowered to an intermediate position between the lowered position and the fully raised position.

7. The miter saw of claim 6, wherein in the intermediate position of the saw unit, the linkage applies a force to the protrusion through a line of action intersecting the protrusion and the first pivot axis, thereby creating a third moment about the third pivot axis that is equal and opposite to the second moment to hold the lower blade guard in the second raised position.

8. The miter saw of claim 7, wherein the third moment is removed from the lower blade guard in response to lowering the saw unit from the intermediate position toward the lowered position, thereby permitting the second biasing member to return the lower blade guard to a position in which it covers the lower portion of the saw blade.

* * * * *